United States Patent
Kwak et al.

(10) Patent No.: US 12,177,841 B2
(45) Date of Patent: Dec. 24, 2024

(54) RESOURCE PARTITIONING FOR SIDELINK

(71) Applicant: QUALCOMM INCORPORATED, San Diego, CA (US)

(72) Inventors: Yongjun Kwak, San Diego, CA (US); Seyedkianoush Hosseini, San Diego, CA (US); Jing Lei, San Diego, CA (US); Hung Dinh Ly, San Diego, CA (US); Yuchul Kim, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 364 days.

(21) Appl. No.: 17/489,419

(22) Filed: Sep. 29, 2021

(65) Prior Publication Data
US 2022/0110142 A1    Apr. 7, 2022

Related U.S. Application Data

(60) Provisional application No. 63/198,212, filed on Oct. 2, 2020.

(51) Int. Cl.
*H04W 72/20*    (2023.01)
*H04L 5/14*    (2006.01)

(52) U.S. Cl.
CPC .............. *H04W 72/20* (2023.01); *H04L 5/14* (2013.01)

(58) Field of Classification Search
CPC . H04W 72/20; H04W 72/0446; H04W 88/04; H04W 72/02; H04L 5/14; H04L 5/0094; H04L 5/1469
See application file for complete search history.

(56) References Cited

U.S. PATENT DOCUMENTS

| 11,659,521 | B2 * | 5/2023 | Wang .................... H04W 72/02 370/329 |
| 11,895,655 | B2 * | 2/2024 | Kwak ................... H04W 76/14 |

(Continued)

FOREIGN PATENT DOCUMENTS

| WO | 2019028847 A1 | 2/2019 |
| WO | WO 2019028847 * | 2/2019 |
| WO | 2020180098 A1 | 9/2020 |

OTHER PUBLICATIONS

WO 2020/180098, Hwang et al. "Information on Sidelink Resource", (Year: 2020).*

(Continued)

*Primary Examiner* — Michael Won
(74) *Attorney, Agent, or Firm* — Arun Swain

(57) ABSTRACT

Wireless communications systems and methods related to resource partitioning for sidelink are provided. A first user equipment (UE) transmits, to a second UE, a time-division duplexing (TDD) configuration indicating a first set of resources time-multiplexed with a second set of resources in a sidelink resource pool, wherein the first set of resources is associated with a first link, and wherein the second set of resources is associated with a second link different from the first link. The first UE receives from the second UE over the first link, a first communication signal in a resource of the first set of resources. The first UE transmits, to the second UE over the second link, a second communication signal using a resource of the second set of resources.

30 Claims, 10 Drawing Sheets

(56) References Cited

U.S. PATENT DOCUMENTS

| | | | | |
|---|---|---|---|---|
| 2016/0295624 | A1* | 10/2016 | Novlan | H04L 67/12 |
| 2018/0069664 | A1* | 3/2018 | Khoryaev | H04L 1/1621 |
| 2018/0242367 | A1* | 8/2018 | Kim | H04W 72/23 |
| 2020/0163005 | A1* | 5/2020 | Rao | H04W 4/40 |
| 2020/0163043 | A1 | 5/2020 | Schmidt et al. | |
| 2021/0014893 | A1* | 1/2021 | Park | H04W 72/27 |
| 2021/0051510 | A1* | 2/2021 | Chae | H04B 17/318 |
| 2021/0051653 | A1* | 2/2021 | Park | H04W 8/22 |
| 2021/0075552 | A1* | 3/2021 | Huang | H04L 1/1864 |
| 2021/0176669 | A1* | 6/2021 | Fakoorian | H04W 72/20 |
| 2021/0289392 | A1* | 9/2021 | Paladugu | H04W 76/14 |
| 2022/0167315 | A1* | 5/2022 | Park | H04W 72/0446 |
| 2023/0354220 | A1* | 11/2023 | Rastegardoost | H04L 5/001 |

OTHER PUBLICATIONS

International Search Report and Written Opinion—PCT/US2021/053036—ISA/EPO—Feb. 1, 2022.

ITL Inc: "Considerations on Resource Allocation for UE-to-Network Relays", R1-154548, 3GPP TSG RAN WG1 Meeting #82, 3rd Generation Partnership Project (3GPP), Mobile Competence Centre, 650, Route Des Lucioles, F-06921 Sophia-Antipolis Cedex, France, vol. RAN WG1, No. Beijing, China, Aug. 24, 2015-Aug. 28, 2015, Aug. 23, 2015 (Aug. 23, 2015), XP051001818, pp. 1-4, Retrieved from the Internet: URL: http://www.3gpp.org/ftp/Meetings_3GPP_SYNC/RAN1/Docs/ [retrieved on Aug. 23, 2015] p. 2, paragraphs after proposal 2 and p. 3, figure 3.

* cited by examiner

RESOURCE PARTITIONING FOR SIDELINK

CROSS-REFERENCE TO RELATED APPLICATIONS

This present applications claims the benefit of, and priority to, U.S. Provisional Patent Application No. 63/198,212, filed Oct. 2, 2020, the entirety of which is incorporated by reference.

TECHNICAL FIELD

This present disclosure is directed to wireless communication systems and methods. Certain embodiments can enable and provide techniques for sidelink resource allocation and partitioning.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink was introduced in LTE to allow a UE to send data to another UE without tunneling through the BS and/or an associated core network. The LTE sidelink technology had been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed bands and/or unlicensed bands.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a first user equipment (UE), includes receiving, from a second UE, a time-division duplexing (TDD) configuration indicating a first set of resources time-multiplexed with a second set of resources in a sidelink resource pool, wherein the first set of resources is associated with a first link, and wherein the second set of resources is associated with a second link different from the first link; receiving, from the second UE over the first link, a first communication signal in a resource of the first set of resources; and transmitting, to the second UE over the second link, a second communication signal using a resource of the second set of resources.

In an additional aspect of the disclosure, a method of wireless communication performed by a first user equipment (UE), includes transmitting, to a second UE, a time-division duplexing (TDD) configuration indicating a first set of resources time-multiplexed with a second set of resources in a sidelink resource pool, wherein the first set of resources is associated with a first link, and wherein the second set of resources is associated with a second link different from the first link; transmitting, to the second UE over the first link, a first communication signal using a resource of the first set of resources; and receiving, from the second UE over the second link, a second communication signal in a resource of the second set of resources.

In an additional aspect of the disclosure, a first user equipment (UE) includes a transceiver configured to receive, from a second UE, a time-division duplexing (TDD) configuration to indicate a first set of resources time-multiplexed with a second set of resources in a sidelink resource pool, wherein the first set of resources is associated with a first link, and wherein the second set of resources is associated with a second link different from the first link; receive, from the second UE over the first link, a first communication signal in a resource of the first set of resources; and transmit, to the second UE over the second link, a second communication signal using a resource of the second set of resources.

In an additional aspect of the disclosure, a first user equipment (UE) includes a transceiver configured to transmit, to a second UE, a time-division duplexing (TDD) configuration to indicate a first set of resources time-multiplexed with a second set of resources in a sidelink resource pool, wherein the first set of resources is associated with a first link, and wherein the second set of resources is associated with a second link different from the first link; transmit, to the second UE over the first link, a first communication signal using a resource of the first set of resources; and receive, from the second UE over the second link, a second communication signal in a resource of the second set of resources.

In an additional aspect of the disclosure, a non-transitory computer-readable medium having program code recorded thereon, the program code includes code for causing a first user equipment (UE) to receive, from a second UE, a time-division duplexing (TDD) configuration indicating a first set of resources time-multiplexed with a second set of resources in a sidelink resource pool, wherein the first set of resources is associated with a first link, and wherein the second set of resources is associated with a second link different from the first link; code for causing a first UE to receive, from the second UE over the first link, a first communication signal in a resource of the first set of resources; and code for causing a first UE transmit, to the second UE over the second link, a second communication signal using a resource of the second set of resources.

In an additional aspect of the disclosure, a non-transitory computer-readable medium having program code recorded thereon, the program code includes code for causing a first user equipment (UE) to transmit, to a second UE, a time-division duplexing (TDD) configuration to indicate a first set of resources time-multiplexed with a second set of resources in a sidelink resource pool, wherein the first set of resources is associated with a first link, and wherein the second set of resources is associated with a second link different from the first link; code for causing a first UE to transmit, to the second UE over the first link, a first communication signal using a resource of the first set of resources; and code for causing a first UE to receive, from the second UE over the second link, a second communication signal in a resource of the second set of resources.

In an additional aspect of the disclosure, a first user equipment (UE) includes means for receiving, from a second UE, a time-division duplexing (TDD) configuration to indicate a first set of resources time-multiplexed with a second set of resources in a sidelink resource pool, wherein the first set of resources is associated with a first link, and wherein the second set of resources is associated with a second link different from the first link; means for receiving, from the second UE over the first link, a first communication signal in a resource of the first set of resources; and means for transmitting, to the second UE over the second link, a second communication signal using a resource of the second set of resources.

In an additional aspect of the disclosure, a first user equipment (UE) includes means for transmitting, to a second UE, a time-division duplexing (TDD) configuration to indicate a first set of resources time-multiplexed with a second set of resources in a sidelink resource pool, wherein the first set of resources is associated with a first link, and wherein the second set of resources is associated with a second link different from the first link; means for transmitting, to the second UE over the first link, a first communication signal using a resource of the first set of resources; and means for receiving, from the second UE over the second link, a second communication signal in a resource of the second set of resources.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
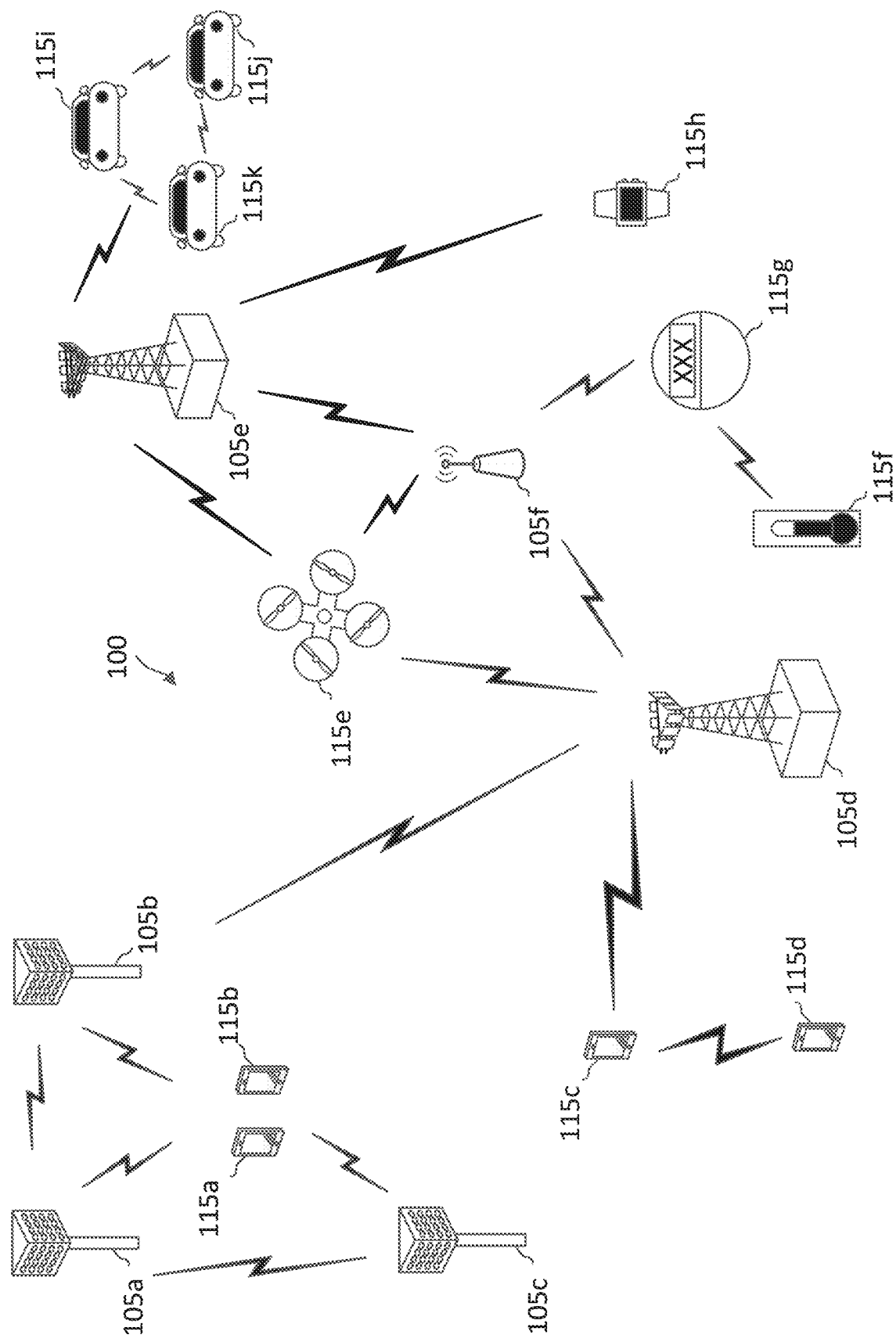
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgment in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Sidelink communications refers to the communications among user equipment devices (UEs) without tunneling through a base station (BS) and/or a core network. Sidelink communication can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink (DL) communication between a BS and a UE. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. In some implementations, the SCI in the PSCCH may referred to as SCI part 1 (SCI-1), and additional SCI, which may be referred to as SCI part 2 (SCI-2) may be carried in the PSSCH. The SCI-2 can include control information (e.g., transmission parameters, modulation coding scheme (MCS)) that are more specific to the data carrier in the PSSCH. Use cases for sidelink communication may include V2X, enhanced mobile broadband (eMBB), industrial IoT (IIoT), NR-lite, and/or NR-super-lite. NR-lite may refer to a reduced-version of NR in terms of UE power consumptions, capabilities, and/or cost. NR-super-lite may refer to a further reduced-version of NR in terms of UE power consumptions, capabilities, and/or cost.

As used herein, the term "sidelink UE" can refer to a user equipment device performing a device-to-device communication or other types of communications with another user equipment device independent of any tunneling through the BS (e.g., gNB) and/or an associated core network. As used herein, the term "sidelink transmitting UE" can refer to a user equipment device performing a sidelink transmission operation. As used herein, the term "sidelink receiving UE" can refer to a user equipment device performing a sidelink reception operation. As used herein, the terms "sync UE", "sidelink sync UE", "anchor UE", or "sidelink anchor UE" refer to a sidelink UE transmitting an S-SSB to facilitate sidelink communications among multiple sidelink UEs (e.g., when operating in a standalone sidelink system), and the terms are interchangeable without departing from the scope of the present disclosure. As used herein, the terms "relay UE" or "sidelink relay" refers to a UE within the coverage of a BS functioning as a relay node between the BS and another UE. As used herein, the term "remote UE" refers to a UE communicating with a BS via a relay UE. A sidelink UE may operate as a transmitting sidelink UE at one time and as a receiving sidelink UE at another time. A sidelink sync UE, a relay UE, or a remote UE may also operate as a transmitting sidelink UE at one time and operate as a receiving sidelink UE at another time.

NR supports two modes of radio resource allocations (RRA), a mode-1 RRA and a mode-2 RRA, for sidelink over a licensed spectrum. The mode-1 RRA supports network controlled RRA that can be used for in-coverage sidelink communication. For instance, a serving BS (e.g., gNB) may determine a radio resource on behalf of a sidelink UE and transmit an indication of the radio resource to the sidelink UE. In some aspects, the serving BS grants a sidelink transmission with downlink control information (DCI). For this mode, however, there is significant base station involvement and is only operable when the sidelink UE is within the coverage area of the serving BS. The mode-2 RRA supports autonomous RRA that can be used for out-of-coverage sidelink UEs or partial-coverage sidelink UEs. For instance, a serving BS may configure a sidelink UE (e.g., while in coverage of the serving BS) with sidelink resource pools which may be used for sidelink when the sidelink UE is out of the coverage of the serving BS. A serving BS may also configure a sidelink UE to operate as a sidelink anchor UE to provide sidelink system information for out-of-coverage sidelink UEs to communicate sidelink communications. For instance, a sidelink anchor UE may provide sidelink system information by broadcasting sidelink-synchronization signal block (S-SSB). The S-SSB may be analogous to the SSB broadcast by a BS. For instance, an S-SSB may include synchronization signals and/or sidelink system information. Some examples of sidelink system information may include a sidelink bandwidth part (BWP) configuration, one or more sidelink transmit resource pools, and/or one or more sidelink receive resource pools, S-SSB transmission related parameters (e.g., sidelink slots configured for S-SSB transmission and/or S-SSB transmission periodicity), and/or any other configuration information related to sidelink communications. In some implementations, an anchor UE may also schedule other sidelink UEs for communications. Thus, a sidelink anchor UE may operate as a mini-gNB facilitating and/or coordinating communications among sidelink UEs over. A sidelink channel where two UEs may communicate with each other directly may also be referred to as a PC5 interface.

The advancement in wireless communication technologies such as NR, had been mostly focused on delivering high-end services (e.g., eMBB) to premium smartphones, which may have high processing and/or power capabilities, and/or services (e.g., URLLC and V2X) for vertical industries. To address scalability, NR-lite had been introduced to enable a more efficient and cost-effective deployment, for example, by relaxing (lowering) the peak data throughput, latency, and/or reliability. Thus, NR-lite may be more suitable for serving mid-end UEs that that may have lower capabilities than the premium UEs. As use cases and diverse deployment scenarios continue to expand in wireless communication, further complexity and/or power consumption reduction may enable the support of low power wide area (LPWA) deployments. For instance, NR-super-lite with further reduced capabilities may support low-end UEs that may have lower capabilities than the mid-end UEs. Some example use cases for NR-super-lite may include delivery of services related to smart metering, asset tracking, and/or personal IoT applications (e.g., health monitoring). Accordingly, there is a need to improve coverage, complexity, and/or power consumption.

In some aspects, a network may utilize sidelink to improve coverage, power consumption and/or complexity for low-end UEs. For example, in some use cases, the sidelink transmission may support UE-to-network relay, in which an in-coverage UE is able to relay signals between a gNB and an out-of-coverage UE (remote UE). Using the relay UE to relay communications between the gNB and the remote UE can improve power efficiencies by avoiding a large number of radio signal repetitions (e.g., up to 2048 repetitions) that may otherwise be required to extend coverage. In some instances, the remote UE may measure the received-signal-indicator (RSSI) level from the gNB, and if the RSSI is below a pre-defined threshold, the remote UE may connect to the in-coverage relay UE. Subsequently, the in-coverage relay UE may receive data and control signaling from the gNB, boost signal power, and transmit them to the sidelink remote UE. In some instances, the remote out-of-coverage UE may be in the same cell as the sidelink relay UE. In some other instances, the remote UE may be in a different cell than the sidelink relay UE.

In some use cases, the sidelink transmission may be utilized to support short distance communications such as wearable or in home new wearable. For example, in short distance sidelink communications, a sidelink UE (a relay) may be utilized to support relaying signals from a gNB to several low power wearable devices. Additionally, in some uses cases, the sidelink relay may be utilized to support a low power operational mode in some technologies such as vehicle-to-everything (V2X) systems. V2X systems enables vehicles to communicate with the traffic and environment around then using short distance communications. The side link relay, may be utilized in V2X system to reduce power consumption of the communication devices connected to an sidelink relay.

In some aspects, a sidelink UE may support half-duplex communications. In other words, the sidelink UE may perform transmission or reception at any given time, but not both transmission and reception at the same time. Thus, the total amount of resources in a sidelink resource pool is shared between transmission and reception. One issue with half-duplex communication is that when a sidelink UE is transmitting in a sidelink resource, the sidelink UE may not be able to monitor other sidelink resources at the same time. As such, if another sidelink UE transmits SCI in one of the other resources indicating a reservation for a future sidelink resource, the UE may not detect the SCI, and thus may not be aware of the reservation. If the UE determines to transmit in the reserved sidelink resource, the UE can cause a collision or interference and impact sidelink performance.

The present application describes mechanisms for resource partitioning between a forward link and a reverse link for sidelink communications to support half-duplex transmission. A forward link may refer to a sidelink in a transmission direction from a relay UE to a remote UE. A reverse link may refer to a sidelink in a transmission direction from a remote UE to a relay UE. For example, a relay UE may partition resources in a sidelink resource pool into a first set of resources for communication over the forward link and a second set of resources for communications over the reverse link. The first set of resources are non-overlapping with the second set of resources to provision for half-duplex communications between the relay UE and the remote UE. The first set of resources may include PSCCH resources and PSSCH resources. Similarly, the second set of resources may include PSCCH resources and PSSCH resources. The relay UE may transmit a time division duplexing (TDD) configuration to a remote UE. The TDD configuration may indicate the first set of resources associated with the forward link and the second set of resources associated with the reverse link. Accordingly, the remote UE may receive the TDD configuration indicating the first set of resources for the forward link and the second set of resources for the reverse link. In some aspects, the relay UE may transmit data and control signaling to the remote UE over the forward link using a resource from the first set of resources. Accordingly, the remote UE may receive the data and control signaling from the relay UE over the forward link in the resource from the first set of resources. In some aspects, the remote UE may transmit data and control signaling to the relay UE over the reverse link using a resource from the second set of resources. Accordingly, the relay UE may receive the data and control signaling from the remote UE over the reverse link in the resource from the second set of resources. In some aspects, the first set of resources and the second set of resources are time-multiplexed with DL/UL transmission in a frame and the relay UE may receive the allocation of the sidelink resource pool from a base station (BS).

In some aspects, the relay UE may perform a semi-static resource partitioning, and thus the TDD configuration may be a semi-static configuration. For instance, the partitioning of the resource pool into the first set of resources for the forward link and the second set of resources for the reverse link may be the same over a relatively long period (e.g., tens of seconds, tens of mins, a few hours). In some aspects, the relay UE may transmit a sidelink broadcast message including the TDD configuration indicating the resource partitioning information, for example, via a physical sidelink broadcast channel (PSBCH). In some other aspects, the relay UE may transmit a sidelink discovery message including the TDD configuration indicating the resource partitioning information during a sidelink discovery procedure in which the relay UE and the remote UE may discover each other.

In some other aspects, the relay UE may perform a dynamic resource partitioning, and thus the TDD configuration may be a dynamic configuration. The relay UE may transmit sidelink channel information (SCI) including the TDD configuration indicating the resource partitioning information, for example, via a PSCCH or a PSSCH. In some aspects, the TDD configuration includes a slot format indicator indicating the slot formats for upcoming slots. For instance, a new SCI format (e.g., SCI3) may be defined for providing forward/reverse sidelink resource partitioning information. In some aspects, the relay UE may transmit the slot format indicator indicating the resource partitioning information. For instance, the relay UE may transmit the slot format indicator periodically indicating forward/reverse link resources in the sidelink resource pool for a certain duration (e.g. about 1 ms, 2 ms, or tens of ms). Accordingly, the remote UE may receive the slot format indicator and update the resource partitioning in accordance with the slot format indicator.

Aspects of the present disclosure can provide several benefits. For example, when the relay UE is an advanced UE (e.g., a high-end or mid-end UE) and the remote UE is an NR superlight UE, the resource partitioning between the forward link and the reverse link can provide power efficient sidelink operations as the remote UE can communicate with the nearby relay UE instead of a far-away BS. Additionally, the sidelink resource partitioning presented in this disclosure can provide a low power operation mode for V2X system. Further, performing resource partitioning between a forward and a reverse link can resolve half-duplex data transmission issues (where a UE may transmit or receive at a given time), and hence increasing sidelink data rates and power efficiency.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE)

devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ an LBT procedure to monitor for transmission opportunities (TXOPs) in the shared channel A wireless communication device may perform an LBT in the shared channel. LBT is a channel access scheme that may be used in the unlicensed spectrum. When the LBT results in an LBT pass (the wireless communication device wins contention for the wireless medium), the wireless communication device may access the shared medium to transmit and/or receive data. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel. Conversely, the LBT results in a failure when a channel reservation signal is detected in the channel. A TXOP may also be referred to as channel occupancy time (COT).

Figure 2:
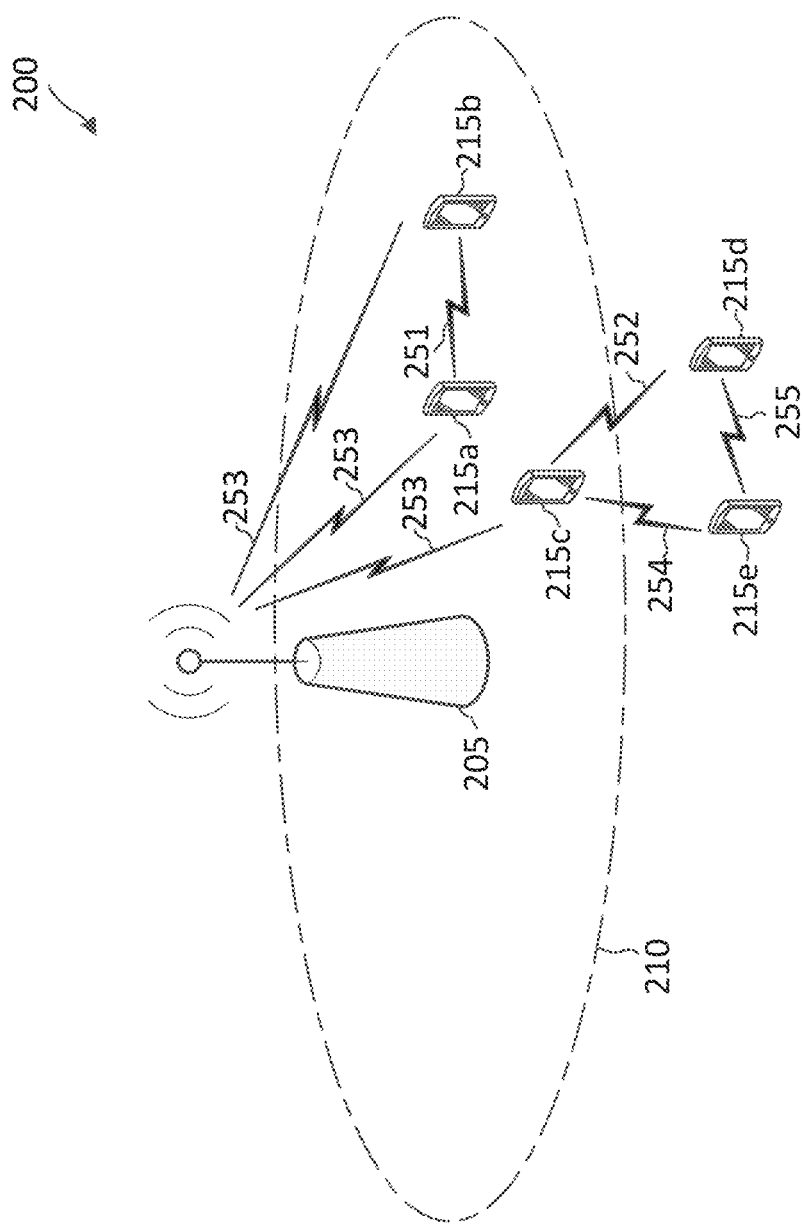
FIG. 2 illustrates a wireless communication network that provisions for sidelink communications according to some aspects of the present disclosure.

In some aspects, the network 100 may provision for sidelink communications to allow a UE 115 to communicate with another UE 115 without tunneling through a BS 105 and/or the core network as shown FIG. 2. As discussed above, sidelink communication can be communicated over a PSCCH and a PSSCH. For instance, the PSCCH may carry SCI and the PSSCH may carry SCI and/or sidelink data (e.g., user data). Each PSCCH is associated with a corresponding PSSCH, where SCI in a PSCCH may carry reservation and/or scheduling information for sidelink data transmission in the associated PSSCH. In some examples, a transmitting sidelink UE 115 may indicate SCI in two stages. In a first-stage SCI, the UE 115 may transmit SCI in PSCCH carrying information for resource allocation and decoding a second-stage SCI. The first-stage SCI may include at least one of a priority, PSSCH resource assignment, resource reservation period (if enabled), PSSCH DMRS pattern (if more than one pattern is configured), a second-stage SCI format (e.g., size of second-stage SCI), an amount of resources for the second-stage SCI, a number of PSSCH demodulation reference signal (DMRS) port(s), a modulation and coding scheme (MCS), etc. In a second-stage SCI, the UE 115 may transmit SCI in PSSCH carrying information for decoding the PSSCH. The second-stage SCI may include a-bit L1 destination identifier (ID), an 8-bit L1 source ID, a HARQ process ID, a new data indicator (NDI), a redundancy version (RV), etc. It should be understood that these are examples, and the first-stage SCI and/or the second-stage SCI may include or indicate additional or different information than those examples provided. Sidelink communication can also be communicated over a physical sidelink feedback control channel (PSFCH), which indicates an acknowledgement(ACK)-negative acknowledgement (NACK) for a previously transmitted PSSCH.

In some aspects, a BS 105 may configure a UE 115 to operate as a sidelink sync or anchor UE 115 to provide sidelink system information for other sidelink UEs 115, which may be out of the coverage of the BS 105, to communicate sidelink communications. The sidelink sync UE 115 may transmit the sidelink system information in the form of S-SSBs. An S-SSB may include synchronization signals (e.g., PSS and/or SSS) and sidelink system information, such as a sidelink BWP configuration, one or more sidelink transmit resource pools, and/or one or more sidelink receive resource pools, S-SSB transmission related parameters (e.g., sidelink slots configured for S-SSB transmission and/or S-SSB transmission periodicity), and/or any other configuration information related to sidelink communications. In some aspects, the BS 105 may configure the sidelink sync UE 115 transmit the S-SSB according to a synchronization raster defined for NR-U. In some instances, the S-SSB according to the NR-U synchronization raster may be offset from a lowest frequency of a corresponding sidelink BWP where the S-SSB is transmitted. In some other aspects, the BS 105 may transmit the S-SSB according to a synchronization raster defined for sidelink. The sidelink synchronization raster can be defined such that the S-SSB may be aligned to a lowest frequency of a corresponding sidelink BWP where the S-SSB is transmitted.

In some aspects, a UE 115 may operate as a relay sidelink UE 115 based on a pre-configuration or a configuration received from a BS 105. The relay sidelink UE 115 may communicate with at least one remote UE 115. The relay UE 115 may relay signals between the remote UE 115 and the BS 105. According to aspects of the present disclosure, the relay UE 115 may transmit a first set of resources time multiplexed with a second set of resources in a sidelink resource pool, for example for improving power efficiency. A BS 105 may provide the total resource pool to the relay sidelink UE 115, where the first set of resources is associated with forward link, and the second set of resources is associated with reverse link. The relay sidelink UE 115 may transmit sidelink data and control signaling (e.g., scheduling information, SCI) to the remote sidelink UE 115. For instance, the relay sidelink UE 115 may transmit data over PSSCH, and control signaling over PSCCH in a resource from the first set of resources. Furthermore, the relay sidelink UE 115 may receive sidelink data and control signaling (e.g., scheduling information, SCI) from the remote sidelink relay UE 115. For instance, the relay UE 115 may receive sidelink data over PSSCH, and control signaling over PSCCH in a resource from the second set of resources.

According to aspects of the present disclosure, a remote sidelink UE 115 may receive a first set of resources time multiplexed with a second set of resources in a sidelink resource pool, for example for improving power efficiency. The first set of resources is associated with forward link, and the second set of resources is associated with reverse link. The remote sidelink UE 115 may receive from a relay sidelink UE 115 sidelink data and control signaling (e.g., scheduling information, SCI). For instance, the remote sidelink UE 115 may receive sidelink data over PSSCH, and control signaling over PCSCH in a resource from the first set of resources. Furthermore, the remote sidelink UE 115 may transmit to a remote sidelink relay UE 115 sidelink data and control signaling (e.g., scheduling information, SCI). For instance, the remote UE 115 may transmit sidelink data over PSSCH, and control signaling may over PCSCH in a resource from the second set of resources.

According to aspects of the present disclosure, the relay sidelink UE 115 may update the remote sidelink UE 115 semi-statically. For instance, the relay side link UE 115 may transmit a sidelink broadcast message over physical sidelink broadcast channel (PSBCH) to the remote sidelink UE 115. In this regard, the sidelink broadcast message includes resource partitioning information (e.g., a TDD configuration) indicating time periods (e.g., subframes or slots) allocated in the resource pool for a forward link (from the relay sidelink UE 115 and the remote UE 115) and time periods allocated in the resource pool a reverse link (from the remote UE 115 to the relay sidelink UE 115). In some other aspects, the sidelink relay UE may provide substantially similar resource partitioning information via a discovery message, for example, during a sidelink discovery procedure.

According to aspects of the present disclosure, the relay sidelink UE 115 may transmit resource portioning information to the remote sidelink UE 115 dynamically. In some aspects, the relay sidelink UE 115 may transmit an SCI via at least one of the PSCCH or the PSCCH. The SCI may include resource partitioning information between the forward and reverse links. In this regard, the remote sidelink UE may receive the resource allocation for forward and/or reverse links. In some aspects, the relay sidelink UE 115 may transmit a slot format indicator (SFI) indicating slot formats for time period within the sidelink resource pool. For instance, the slot formats may indicate whether a time period in the sidelink resource pool is allocated for the forward link or the reverse link. In some aspects, the relay sidelink UE 115 may transmit the slot format indicator to the remote sidelink UE 115 via a new sidelink channel or SCI type (e.g., SCI3). In some aspects, the relay sidelink UE 115 may transmit the slot format indicator periodically.

FIG. 2 illustrates an example of a wireless communication network 200 that provisions for sidelink communications according to embodiments of the present disclosure. The network 200 may correspond to a portion of the network 100. FIG. 2 illustrates one BSs 205 and five UEs 215 (shown as 215a, 215b, 215c, 215d, and 215e) for purposes of simplicity of discussion, though it will be recognized that embodiments of the present disclosure may scale to any suitable number of UEs 215 (e.g., the about 2, 3, 4, 6, 7 or more) and/or BSs 205 (e.g., the about 2, 3 or more). The BS 205 and the UEs 215 may be similar to the BSs 105 and the UEs 115, respectively. The BSs 205 and the UEs 215 may share the same radio frequency band for communications. In some instances, the radio frequency band may be a 2.4 GHz unlicensed band, a 5 GHz unlicensed band, or a 6 GHz unlicensed band. In general, the shared radio frequency band may be at any suitable frequency.

In the network 200, some of the UEs 215a-215e may communicate with each other in peer-to-peer communications. For example, the UE 215c may communicate with the UE 215e over a sidelink 254, and may communicate to UE 215d over yet another sidelink 252. The sidelinks 252, and 254 are unicast bidirectional links. Some of the UEs 215 may also communicate with the BS 205 in a UL direction and/or a DL direction via communication links 253. For instance, the UE 215a, 215b, are within a coverage area 210 of the BS 205, and thus may be in communication with the BS 205. In some instances, the UE 215c may operate as a relay for the UE 215e,215d to reach the BS 205. In some aspects, some of the UEs 215 are associated with vehicles (e.g., similar to the UEs 115*i-k*) and the communications over the sidelinks 252, and 254 may be C-V2X communications. C-V2X communications may refer to communications between vehicles and any other wireless communication devices in a cellular network. In some aspects, some of the UEs 215 are IoT devices such as metering devices, asset tracking devices, health monitoring devices, personal wearable devices and the communications over the sidelinks 252, and 254 may be IoT data associated with corresponding services or applications.

In some aspects, the UE 215*e* may serve as a sidelink anchor UE and UE 215*c* may serve as a sidelink receiving UE, where UE 215*e* transmits system parameter information including timing synchronization signals over a sidelink broadcast channel (e.g., PSBCH) such that the UE 215*c* can receive and recover resource allocation and timing information to facilitate a sidelink communication with the UE 215*e*. For purposes of explanation and brevity of discussion, the remaining description for FIG. 2 will be discussed in reference to UE 215*c* (e.g., sidelink receiving UE) and UE 215*e* (e.g., sidelink anchor UE).

Sidelink discovery of other sidelink transmitting UEs, such as other anchor nodes, can be facilitated through the use of a transport channel referred to as a transport sidelink discovery channel (SL-DCH), and its physical counterpart, the physical sidelink discovery channel (e.g., PSDCH). In some aspects, a sidelink transmitting UE can transmit one or more announcement messages that are generated using physical layer transport blocks with zero media access control overhead. For example, the UE 215*e* can broadcast an announcement message over the PSDCH to announce its status as an anchor node.

In various embodiments, the sidelink anchor UE may utilize the sidelink discovery procedure to: 1) announce its presence as the anchor UE to potentially proximal sidelink UEs by transmitting a message containing its application information or other useful information fields (e.g., GPS coordinates, time, and the like), and 2) monitor the presence of other proximal sidelink UEs by detecting and decoding the corresponding discovery messages, and respond to the sidelink transmitting UEs using similar discovery messages. In some instances, the discovery message may include information about the type of discovery being performed and/or the type of content (e.g., announcement, query) provided by the sidelink transmitting UE. For example, the UE 215*e* may broadcast a discovery message over the PSDCH, in which the discovery message includes an indication that the discovery message pertains to an announcement of its anchor node status.

In some aspects, UE 215*e* may perform a sensing operation on one or more of a discovery channel, such as the PSDCH, or a sidelink broadcast channel, such as the PSBCH, depending on implementation. If the UE 215*e* does not detect an existing anchor UE on the discovery channel, then the UE 215*e* may configure itself as an anchor UE and broadcast an announcement indicating itself to be the anchor UE. If the UE 215*e* detects an existing anchor UE, the UE 215*e* may determine whether there is a need for it to become an anchor node within the wireless communication network 200.

In some aspects, the UE 215*e* may provide a transmission resource pool configuration that includes configuration information for a discovery resource pool configuration and a control/data communication resource pool configuration. Sidelink receiving UEs (e.g., UE 215*c*) may monitor multiple resources to listen for discovery announcements communicated by anchor UEs (e.g., UE 215*e*) to minimize and/or avoid sidelink UE interference. At the end of a discovery procedure, the UE 215*e* and the UE 215*c* may establish a communication link for sidelink communication.

Figure 3:
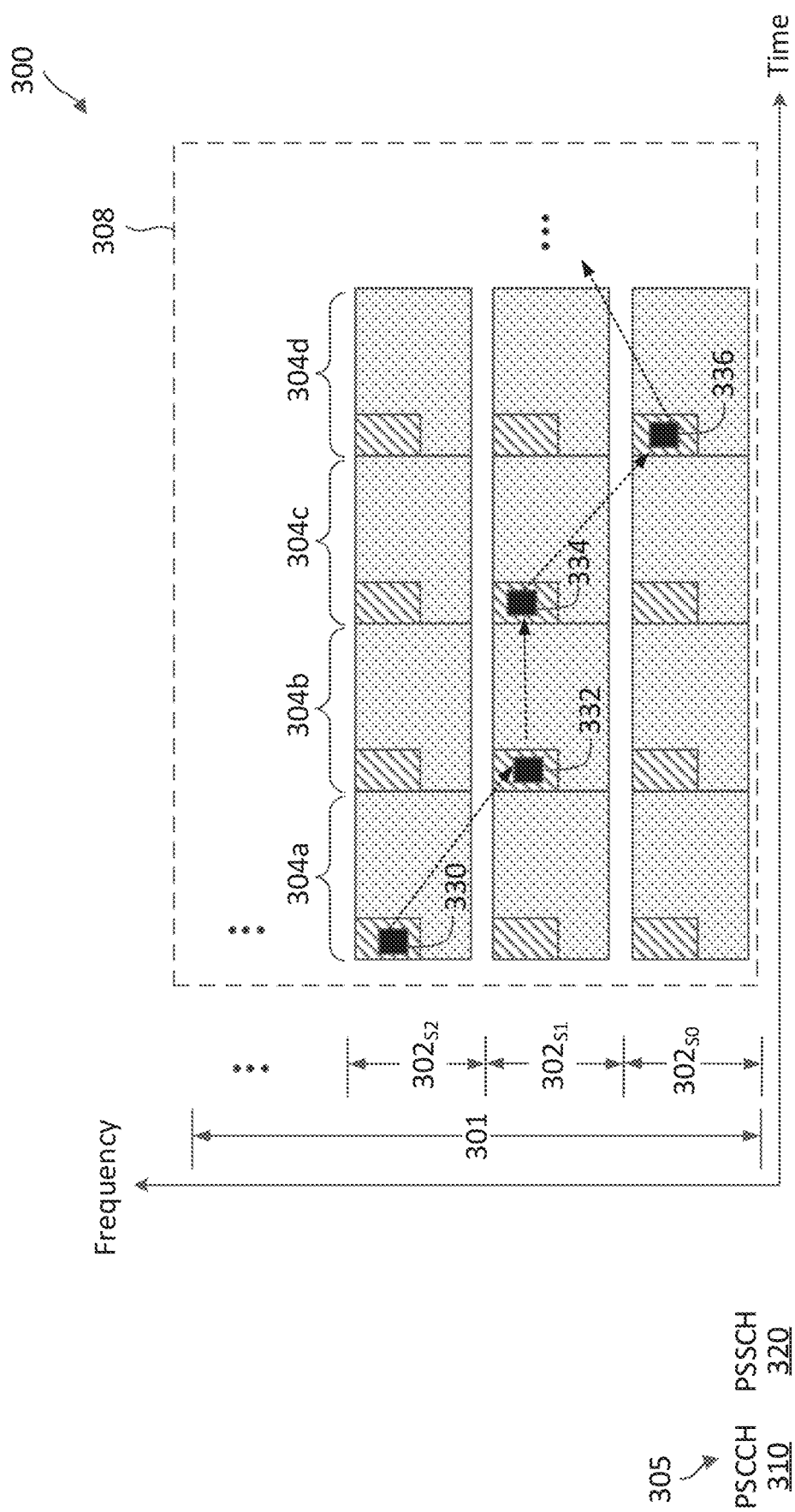
FIG. 3 illustrates a sidelink communication scheme according to some aspects of the present disclosure.

FIG. 3 illustrates a sidelink communication scheme 300 according to some aspects of the present disclosure. The scheme 300 may be employed by UEs such as the UEs 115 and/or 215 in a network such as the networks 100 and/or 200. In particular, sidelink UEs may employ the scheme 300 to communicate sidelink over a shared radio frequency band (e.g., in a shared spectrum or an unlicensed spectrum). The shared radio frequency band may be shared by multiple RATs as discussed in FIG. 2. In FIG. 3, the x-axis represents time in some arbitrary units, and the y-axis represents frequency in some arbitrary units.

In the scheme 300, a shared radio frequency band 301 is partitioned into a plurality of subchannels or frequency subbands 302 (shown as $302_{S0}$, $302_{S1}$, $302_{S2}$, . . . ) in frequency and a plurality of sidelink frames 304 (shown as 304*a*, 304*b*, 304*c*, 304*d*, . . . ) in time for sidelink communication. The frequency band 301 may be at any suitable frequencies (e.g., at about 2.4 GHz, 5 GHz, or 6 GHz). The frequency band 301 may have any suitable BW and may be partitioned into any suitable number of frequency subbands 302. The number of frequency subbands 302 can be dependent on the sidelink communication BW requirement. The frequency band 301 may be at any suitable frequencies. In some aspects, the frequency band 301 is a 2.4 GHz unlicensed band and may have a bandwidth of about 80 megahertz (MHz) partitioned into about fifteen 5 MHz frequency subbands 302.

A sidelink UE (e.g., the UEs 115 and/or 215) may be equipped with a wideband receiver and a narrowband transmitter. For instance, the UE may utilize the narrowband transmitter to access a frequency subband $302_{S2}$ for sidelink transmission utilizing a frame structure 304. The frame structure 304 is repeated in each frequency subband 302. In some instances, there can be a frequency gap or guard band between adjacent frequency subbands 302 as shown in FIG. 3, for example, to mitigate adjacent band interference. Thus, multiple sidelink data may be communicated simultaneously in different frequency subbands 302 (e.g., FDM). The frame structure 304 is also repeated in time. For instance, the frequency subband $302_{S2}$ may be time-partitioned into a plurality of frames with the frame structure 304.

The frame structure 304 includes a sidelink resource 306 in each frequency subband 302. A legend 305 indicates the types of sidelink channels within a sidelink resource 306. The sidelink resource 306 may have a substantially similar structure as an NR sidelink resource. For instance, the sidelink resource 306 may include a number of subcarriers or RBs in frequency and a number of symbols in time. In some instances, the sidelink resource 306 may have a duration between about one millisecond (ms) to about 20 ms. Each sidelink resource 306 may include a PSCCH 310 and a PSSCH 320. The PSCCH 310 and the PSSCH 320 can be multiplexed in time and/or frequency. In the illustrated example of FIG. 3, for each sidelink resource 306, the PSCCH 310 is located during the beginning symbol(s) (e.g., about 1 symbol or about 2 symbols) of the sidelink resource 306 and occupies a portion of a corresponding frequency subband 302, and the PSSCH 320 occupies the remaining time-frequency resources in the sidelink resource 306. In some instances, a sidelink resource 306 may also include a physical sidelink feedback channel (PSFCH), for example, located during the ending symbol(s) of the sidelink resource 306. In general, a PSCCH 310, a PSSCH 320, and/or a PSFCH may be multiplexed in any suitable configuration within a sidelink resource 306.

In sidelink communication, in order for the sidelink receiving UEs to successfully decode the PSCCH 310 and PSSCH 320, information describing the specific resources assigned by the sidelink anchor UE for transmission and the transmission configuration can be carried in the sidelink control information, SCI. In this respect, control information for sidelink communication may be communicated in the form of SCI messages. The SCI message may be transmitted over the PSCCH 310, which carries the information related to the transmission of data over the PSSCH 320.

The SCI may inform the sidelink receiving UEs about a resource reservation interval, a frequency location of initial transmission and retransmission, a time gap between initial transmission and retransmission, and modulation and coding scheme (MCS) used to modulate the data transmitted over the PSSCH 320.

The SCI messages may be populated based on the modes of radio resource allocations (e.g., mode-1 RRA or mode-2 RRA). For mode-1 RRA, the SCI may be populated using higher layer information carried by L3 control signaling (e.g., RRC, and L1 control signaling configured at a cell, such as BS 205). For mode-2 RRA, the SCI may be populated based on autonomous decisions taken by each sidelink anchor UE. The structure of the SCI message may include a frequency hopping flag field, a resource block assignment and hopping resource allocation field, a time resource pattern field, MCS field, a time advance field and a group destination identifier field. The structure of the SCI message may include other additional fields that are suitable to support V2X control signaling. The frequency hopping flag field and the resource block assignment and hopping resource allocation field may provide information for the sidelink receiving UEs to identify the RBs where the data channel (e.g., PSSCH 320) resides. The sidelink anchor UE may autonomously configure each of these two fields. The identified RBs may belong to a sidelink communication resource pool (e.g., PSSCH resource pool). The time resource pattern field may provide the time-domain resource allocation for the data channel (e.g., PSSCH 320), and in particular the potential subframes used for PSSCH transmission. The MCS field may provide the MCS used for the PSSCH 320, which may be autonomously selected by the sidelink anchor UE. The timing advance field may provide a sidelink time adjustment for mode-2 RRA or other applicable mode. The group destination identifier field may indicate a group of sidelink receiving UEs that are potentially interested in the transmitted message from the sidelink anchor UE. This may be used by the sidelink receiving UE to ignore messages destined to other groups of sidelink UEs.

In some aspects, the SCI messages may be processed with transport channel encoding to generate SCI message transport blocks, which are then followed with physical channel encoding to generate corresponding PSCCH blocks. The PSCCH blocks are carried on respective subframe resource units for transmission. The sidelink receiving UE may receive one or more resource units over respective subframes to recover the control signaling information, and can extract the data channel allocation and transmission configuration.

The PSCCH 310 can be used for carrying SCI 330. The PSSCH 320 can be used for carrying sidelink data. The sidelink data can be of various forms and types depending on the sidelink application. For instance, when the sidelink application is a V2X application, the sidelink data may carry V2X data (e.g., vehicle location information, traveling speed and/or direction, vehicle sensing measurements, etc.). Alternatively, when the sidelink application is an IIoT application, the sidelink data may carry IIoT data (e.g., sensor measurements, device measurements, temperature readings, etc.). The PSFCH can be used for carrying feedback information, for example, HARQ ACK/NACK for sidelink data received in an earlier sidelink resource 306.

In some aspects, the scheme 300 is used for synchronous sidelink communication. In other words, the sidelink UEs are synchronized in time and are aligned in terms of symbol boundary, sidelink resource boundary (e.g., the starting time of sidelink frames 304). The sidelink UEs may perform synchronization in a variety of forms, for example, based on sidelink SSBs received from a sidelink UE and/or NR-U SSBs received from a BS (e.g., the BSs 105 and/or 205) while in-coverage of the BS. In some aspects, the sidelink UE may be preconfigured with the resource pool 308 in the frequency band 301, for example, while in a coverage of a serving BS according to a mode-1 RRA configuration. The resource pool 308 may include a plurality of sidelink resources 306.

In an NR sidelink frame structure, the sidelink frames 304 in a resource pool 308 may be contiguous in time. A sidelink receiving UE (e.g., the UEs 115 and/or 215) may include, in SCI 330, a reservation for a sidelink resource 306 in a later sidelink frame 304. Thus, another sidelink UE (e.g., a UE in the same NR-U sidelink system) may perform SCI sensing in the resource pool 308 to determine whether a sidelink resource 306 is available or occupied. For instance, if the sidelink UE detected SCI indicating a reservation for a sidelink resource 306, the sidelink UE may refrain from transmitting in the reserved sidelink resource 306. If the sidelink UE determines that there is no reservation detected for a sidelink resource 306, the sidelink UE may transmit in the sidelink resource 306. As such, SCI sensing can assist a UE in identifying a target frequency subband 302 to reserve for sidelink communication and to avoid intra-system collision with another sidelink UE in the NR sidelink system. In some aspects, the UE may be configured with a sensing window for SCI sensing or monitoring to reduce intra-system collision.

In some aspects, the sidelink UE may be configured with a frequency hopping pattern. In this regard, the sidelink UE may hop from one frequency subband 302 in one sidelink frame 304 to another frequency subband 302 in another sidelink frame 304. In the illustrated example of FIG. 3, during the sidelink frame 304a, the sidelink UE transmits SCI 330 in the sidelink resource 306 located in the frequency subband $302_{S2}$ to reserve a sidelink resource 306 in a next sidelink frame 304b located at the frequency subband $302_{S1}$. Similarly, during the sidelink frame 304b, the sidelink UE transmits SCI 332 in the sidelink resource 306 located in the frequency subband $302_{S1}$ to reserve a sidelink resource 306 in a next sidelink frame 304c located at the frequency subband $302_{S1}$. During the sidelink frame 304c, the sidelink UE transmits SCI 334 in the sidelink resource 306 located in the frequency subband $302_{S1}$ to reserve a sidelink resource 306 in a next sidelink frame 304d located at the frequency subband $302_{S0}$. During the sidelink frame 304d, the sidelink UE transmits SCI 336 in the sidelink resource 306 located in the frequency subband $302_{S0}$. The SCI 336 may reserve a sidelink resource 306 in a later sidelink frame 304.

The SCI can also indicate scheduling information and/or a destination identifier (ID) identifying a target sidelink receiving UE for the next sidelink resource 306. Thus, a sidelink UE may monitor SCI transmitted by other sidelink UEs. Upon detecting SCI in a sidelink resource 306, the sidelink UE may determine whether the sidelink UE is the target receiver based on the destination ID. If the sidelink UE is the target receiver, the sidelink UE may proceed to receive and decode the sidelink data indicated by the SCI. In some aspects, multiple sidelink UEs may simultaneously communicate sidelink data in a sidelink frame 304 in different frequency subband (e.g., via FDM). For instance, in the sidelink frame 304b, one pair of sidelink UEs may communicate sidelink data using a sidelink resource 306 in the frequency subband $302_{S2}$ while another pair of sidelink UEs may communicates sidelink data using a sidelink resource 306 in the frequency subband $302_{S1}$.

Figure 4:
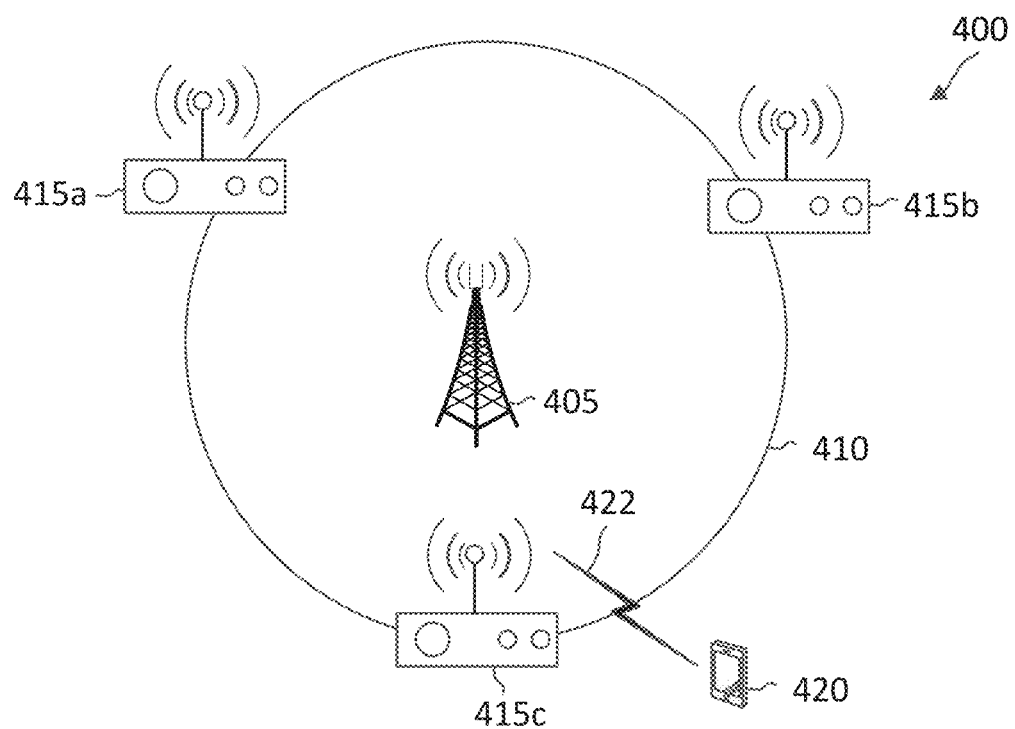
FIG. 4 illustrates a sidelink deployment scenario according to some aspects of the present disclosure.

FIG. 4 illustrates a sidelink deployment scenario 400 according to some aspects of the present disclosure. The scenario 400 illustrates utilization of sidelink for coverage extension. In the scenario 400, relay UEs 415 (shown as 415a, 415b, 415c) in communication with a BS 405 are deployed to extend a coverage 410 of the BS 105. The relay UEs 415a, 415b, 415c may be similar to the UEs 115 and/or 215. The BS 405 may be similar to the UEs 115 and/or 215. Although FIG. 4 illustrates three relay UEs 415, it should be understood that in other examples a network may include any suitable number of relay UEs (e.g., about 2, 4, 5, 6, or more). The relay UEs 415 can facilitate communications between the BS 405 and UEs that are outside of the coverage area 410.

In the illustrated example of FIG. 4, the relay UE 415c operate as a relay for a remote UE 420 outside of the BS 405's coverage area 410. The remote UE 420 may be similar to the UEs 115 and/or 215. In some aspects, the relay UE 415c can be a more advanced UE than the remote UE 420. Although FIG. 4 illustrates the relay UE 415c operating as a relay for one remote UE 420, it should be understood that in other examples a relay UE can operate as a relay for any suitable number of remote UEs (e.g., about 2, 4, 5, 6, or more). The relay UE 415c may receive data and/or control information from the remote UE 420 and forward the received data and/or control to the BS 405. For instance, the data and/or control information received from the remote UE 420 are UL data and/or control information for the BS 405. The relay UE 415c may also receive data and/or control information from the BS 405 and forward the received data and/or control to the remote UE 420. For instance, the data and/or control information received from the BS 405 are DL data and/or control information for the remote UE 420. As such, the relay UE 415c can provide a communication path between the BS 405 and the UE 420 that may otherwise be unreachable by the BS 405. The communication path between the relay UE 415c and the remote UE 420 may be a PC5 interface (shown as a sidelink 422). For instance, the relay UE 415c and the remote UE 420 may communicate using sidelink channels PSSCH and/or PSCCH and/or sidelink resources as discussed above in relation to FIG. 3.

The utilization of sidelink can extend the coverage area of the BS 405 without increasing system resource utilization. For instance, without the utilization of the relay UE 415c, transmissions between the BS 405 and the remote UE 420 may require a large number of repetitions. For instance, the BS 405 may repeat each information data block, for example, about 2048 times, in a transmission before the transmission can be received by the remote UE 420. Similarly, the remote UE 420 may repeat each information data block, for example, about 2048 times, in a transmission before the transmission can be received by the BS 405. While the use of high repetitions can potentially allow the BS 405 to communicate with the remote UE 420, the use of high repetitions can increase power consumption at the remote UE 420. The high repetitions and/or high-power consumption at the remote UE 420 may not be feasible, for example, when the remote UE 420 is a low-end UE with limited processing and/or power resources. Accordingly, the deployment of the relay UE 415c allows the remote UE 420 to communicate with the relay UE 415c, which may be located at a closer distance to the remote UE 420 than the BS 405. Thus, the remote UE 420 may communicate with the relay UE 415c without consuming a large amount of power. Hence, sidelink can improve power efficiency for long-distance UL and/or DL communications. In some instances, sidelink can extend the reach or coverage by providing about a 20 decibels (dB) power boost.

Figure 5:
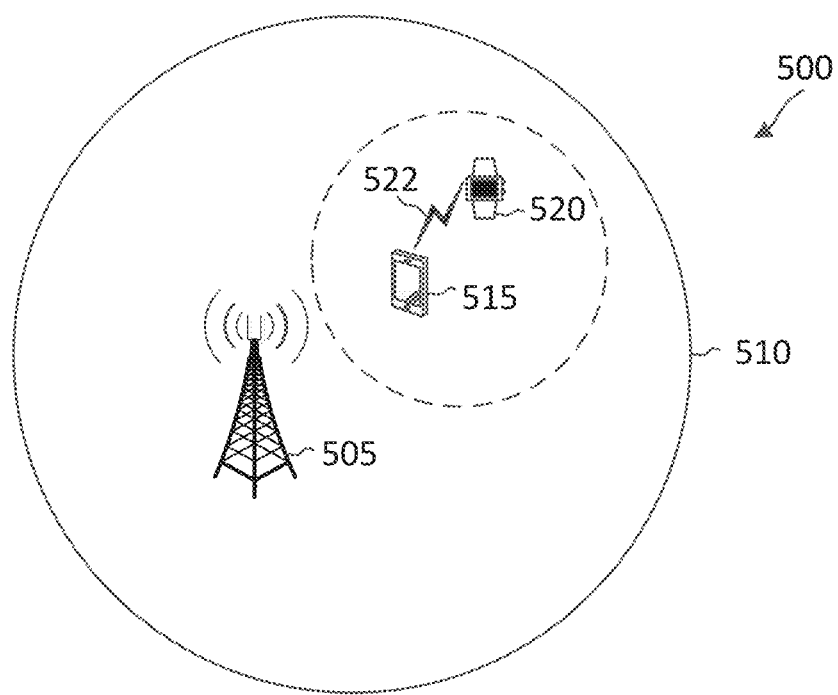
FIG. 5 illustrates a sidelink deployment scenario according to some aspects of the present disclosure.

FIG. 5 illustrates a sidelink deployment scenario 500 according to some aspects of the present disclosure. The scenario 500 illustrates utilization of sidelink for short-range, low-power sidelink communication, for example, for wearable or in-home network. In the scenario 500, a relay UE 515 in communication with a BS 505 is deployed to operate as a central hub or anchor UE for a remote UE 520. The BS 505 may be similar to the UEs 115 and/or 215. The relay UE 515 and/or the remote UE 520 may be similar to the UEs 115 and/or 215. However, the relay UE 515 can be a more advanced UE than the remote UE 420. For instance, the relay UE 515 may be a high-end UE or a mid-end UE, whereas the remote UE 420 may be a low-end UE (e.g., personal wearable devices, health monitoring devices, and/or like). Although FIG. 5 illustrates one relay UE 515 serving one remote UE 520, it should be understood that in other examples a network may include any suitable number of relay UEs (e.g., about 2, 3, 4, 5, 6, or more) serving any suitable number of remote UEs (e.g., about 2, 3, 4, 5, or more).

Similar to the scenario 400, the relay UE 515 may communicate with the remote UE 520 via a sidelink 522. However, the remote UE 520 may or may not have communication link established with the BS 505, for example, depending on the device types and/or applications in use. In some other instances, a V2X or D2D system may be deployed in a scenario similar to the scenario 500.

As can be seen from the scenarios 400 and 500, sidelink can be utilized to improve power efficiency, for example, for NR-super-lite where the focus is low-power operations for low-end UEs.

Accordingly, the present disclosure provides sidelink resource allocation techniques that can facilitate low-power communications over sidelink, for example, by separating partitioning resources a sidelink resource pool into a first set of resources for communications over a forward link (from a relay UE to a remote UE) and a second set of resources for communication over a reverse link (from a remote UE to a relay UE). The partitioning or separation between forward link resources and reverse link resource can avoid the half-duplex link issues discussed above. additionally, since a remote UE may only be required to monitor the forward link resources, and not the reverse link resources, the resource partitioning can reduce the amount of resources in the sidelink resource pool that a remote UE is required to monitor, and thus may provide further power saving at the remote UE.

Figure 6:
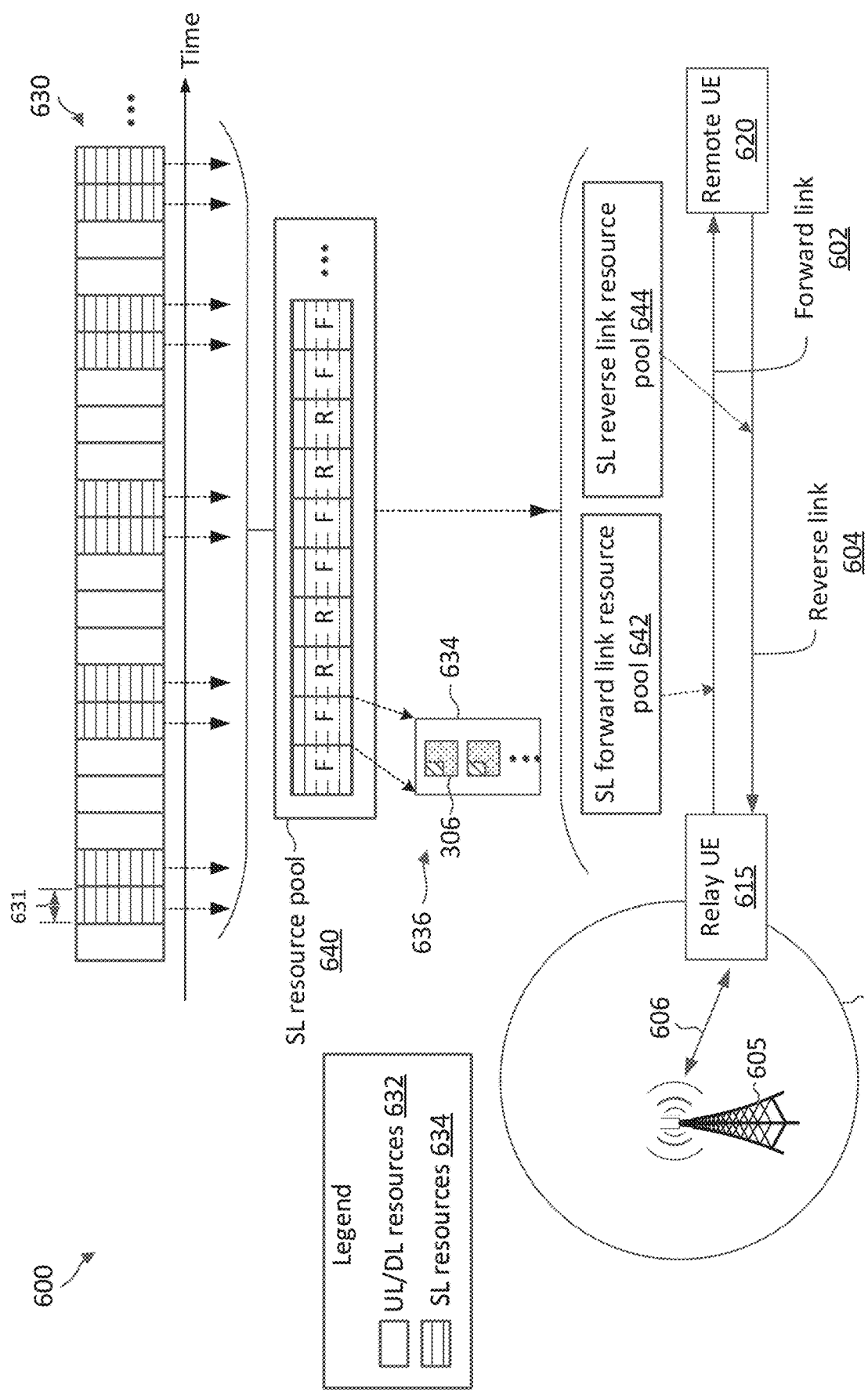
FIG. 6 is a sidelink communication scheme illustrating the resource pool partitioning according to some aspects of the present disclosure.

FIG. 6 illustrates a resource partitioning scheme 600 according to some aspects of the present disclosure. The scheme 600 may be employed by UEs such as the UEs 115, 215 and/or 415,420, 510,520 in a network such as the networks 100 and/or 200 and/or in the scenarios 400 and 500 for sidelink communications. In particular, sidelink UEs may employ the scheme 600 to perform resource partitioning, for example, allocation of time slot to forward and/or reverse links for sidelink communication. In FIG. 6, the x-axis represents time in some arbitrary units, and the y-axis represents frequency in some arbitrary units. In the scheme 600, a relay UE 615 within a coverage area 610 of a BS 605 and in communication with the BS 605 over a link 606 may operate as a relay for a remote UE 620. For instance, the relay UE 615 may relay UL communication (received over a reverse link 604) from the remote UE 620 to the BS 605 (over the link 606) and/or relay DL communication from the BS 605 (over the link 606) to the remote UE 620 (over a forward link 602). The BS 605 may be similar to the BSs 105, 205, 405, and/or 505. The relay UE 615 and/or the remote UEs 620 may be similar to the UEs 115 and/or 215. In some instances, the relay UE 615 may correspond to the relay UE 415c, and the remote UE 620 may correspond to the remote UE 420 in the scenario 400. In some instances, the relay UE 615 may correspond to the relay 515, and the remote UE 620 may correspond to the remote UE 520 in the scenario 500. The scheme 600 can be employed in conjunction with the scheme 300.

In the scheme 600, a BS 605 may configure resources 630 (e.g., time-frequency resources) for communications with one or more UEs (e.g., the UEs 115, 215, 415, 515, and/or 615) in a coverage area 610 of the BS 605. The resources 630 may be over a licensed band or a shared radio frequency band (e.g., in a shared spectrum or an unlicensed spectrum) and may be partitioned in time as shown. For instance, the resources 630 are in units of slots 631, for example, each including about 14 symbols. The resources 630 may include UL/DL resources 632 time-multiplexed with sidelink (SL) resources 634 in a time domain frame. The BS 605 may communicate with UEs (e.g., the UE 615) within the coverage area 610 using the UL/DL resources 632. In this regard, the UL/DL resources 632 can be further partitioned into a set of slots 631 for UL communications and slots 631 and another set of slots 631 for DL communications. The SL resources 634 may be used for sidelink communication between the relay UE 615 and the remote UE 620. The BS 605 may configure the relay UE 615 with the resources 630 as shown. The resources 630 may include SL resources only in a time domain frame and the BS 605 may communicate with UEs (e.g., the UE 615) using a separate carrier.

In some aspects, the relay UE 615 may determine a sidelink resource pool 640 from the SL resources 634. It should be noted that the sidelink resource pool 640 may include SL resources 634 that are contiguous in time and/or SL resources 634 that are non-contiguous in time. To facilitate half-duplex communication, the relay UE 615 may partition the sidelink resources 634 in the sidelink resource pool 640 into a first set of resources for communications over a forward link 602 (from the relay UE 615 to the remote UE 620) and a second set of resources for communications over a reverse link 604 from the remote UE 620 to the relay UE 615.

In the illustrated example of FIG. 6, the first set of resources 634 (or slots 631) for the forward link 602 are shown as "F", and the second set of resources 634 (or slots 631) for the reverse link 604 are shown as "R". In other words, the relay UE 615 partitions the sidelink resource pool 640 into a SL forward link resource pool 642 and a SL reverse link resource pool 644. In some aspects, the SL resource 634 may be similar to the resources 306 of FIG. 3, each including a PSCCH 310 and a PSSCH 320. In some instances, the slot 631 may be similar to the sidelink slot 304 of FIG. 3. In some other instances, the SL resource pool 640 may span multiple frequency subbands and may have a similar resource pool structure as the resource pool 308 of FIG. 3 as shown by reference numeral 636. For instance, the SL resource pool 640 may include multiple sidelink resources 306 across the frequency subbands within each time slot, where each time slot is assigned to the forward link 602 or the reverse link 604.

To facilitate communications between the relay UE 615 and the remote UE 620, the remote UE 620 may configure the remote UE 620 with the resource partitioning information. For instance, the relay UE 615 may transmit TDD configuration to the remote UE 620. The TDD configuration may indicate the first set of resources 634 for the forward link 602 and the second set of resources 634 for the reverse link 602. In some aspects, the TDD configuration may provide a resource pattern. For instance, the TDD configuration may indicate a pattern of "FFRRFFRRFF . . . " as shown to indicate a transmission direction for each resource 634. In general, the partitioning between the SL resources for the forward link 602 and the reverse link 604 may be in any suitable time order and may be divided equally or differently between the forward link 602 and the reverse link 604. In some aspects, the pattern may be for a certain number of slots (e.g., about 10, 20, 30, 40, or more) and may be periodic.

In some aspects, the relay UE 615 may perform semi-static resource partitioning (for forward link resources and reverse link resources) and may provide information (a semi-static TDD configuration) related to the SL resource pool 640 to the remote UE 620 via PSBCH. For instance, the relay UE 615 may be configured to perform operations similar to a sync UE as discussed above, and may transmit a broadcast message indicating the TDD configuration via the PSBCH. In some other aspects, relay UE 615 and the remote UE 620 may perform sidelink discovery as discussed above, the relay UE 615 may provide the TDD configuration or the SL resource pool 640 to the remote UE 620 during the discovery procedure. For instance, the relay UE 615 may transmit a discovery message indicating the TDD configuration. In some aspects, the discovery message may be carried in a PSDCH. In some other aspects, the discovery message may be carried in a PSSCH. For instance, prior to the resource partitioning configuration, the remote UE 620 may be preconfigured with certain sidelink resources and may perform sensing in the sidelink resources to monitor for a broadcast message and/or a discovery message indicating the TDD configuration. In some aspects, the semi-static TDD configuration information is provided as RRC signaling.

After configuring the remote UE 620 with the resource partitioning information, the relay UE 615 may communicate with the remote UE 620 in accordance with the resource partitioning information. In this regard, the relay UE 615 may transmit sidelink data and control signaling (e.g., scheduling information, SCI) to the remote UE 620 using resources from the first set of resources (e.g., the SL forward link resource pool 642). For instance, the relay UE 615 may transmit data over PSSCH, and control signaling over PSCCH in a resource from the first set of resources. Accordingly, the remote UE 620 may receive sidelink data over PSSCH, and control signaling over PSCCH in a resource from the first set of resources (e.g., the SL forward link resource pool 642). Furthermore, the remote UE 620 may transmit sidelink data and control signaling (e.g., scheduling information, SCI) to the relay UE 615 using resources from the second set of resources (e.g., the SL reverse link resource pool 644). For instance, the remote UE 620 may transmit data over PSSCH, and control signaling over PSCCH in a resource from the second set of resources. Accordingly, the relay UE 620 may receive sidelink data over PSSCH, and control signaling over PSCCH in a resource from the second set of resources (e.g., the SL reverse link resource pool 644).

In some aspects, the remote UE 620 can receive, from the relay UE 615, and decode the physical communication channels (e.g., PSCCH 310, PSSCH 320) in the forward resource pool 642, and encode and transmit the PSCCH 310 and PSSCH 320 to the relay UE 615 in the forward resource pool 642. Additionally, the relay UE 615 can receive, from the remote UE 620, and decode the physical communication channels (e.g., PSCCH 310, PSSCH 320) in the reverse resource pool 644, and encode and transmit the PSCCH 310 and PSSCH 320 to the remote UE 620 in the reverse resource pool 644.

In some aspects, the relay UE 615 may perform dynamic resource partitioning (for forward link resources and reverse link resources) and may provide information (a dynamic TDD configuration) related to the SL resource pool 640 to the remote UE 620 via SCI. In this regard, the relay UE 615 may transmit SCI to the remote UE 620 in at least one of PSSCH or PSCCH channels, where the SCI may include configuration information associated with sidelink resource pool 640. In some aspects, the relay UE 615 may update the resource partitioning based on traffic needs and/or channel conditions over the forward link 602 and the reverse link 604 and may adapt to changes in traffic needs and/or the channel conditions.

In some aspects, the relay UE 615 may transmit a slot format indicator (SFI) to the remote UE 620 indicating the sidelink resource pools slots (e.g., 642, 644). In some aspects, the SFI may be transmitted over a new sidelink channel (e.g., SCI3). In some aspects, the SFI may indicate a similar slot pattern (e.g., "FFRRFFRRFF") discussed above with respect to the semi-static configuration, but the slot pattern may be a next set of slots and may not be repeated. In some examples, the relay UE 615 may transmit the slot format indicator to the remote UE 620 periodically. In some aspects, the remote UE 620 can receive and decode the physical communication channels (e.g., PSCCH 310, PSSCH 320) from the relay UE 615 based on the forward resource pool 642, and encode and transmit the PSCCH 310 and PSSCH 320 to the relay UE 615 based on the forward resource pool 642. Additionally, the relay UE 615 can receive and decode the physical communication channels (e.g., PSCCH 310, PSSCH 320) from the remote UE 620 based on the reverse resource pool 644, and encode and transmit the PSCCH 310 and PSSCH 320 to the remote UE 620 based on the reverse resource pool 644.

Figure 7:
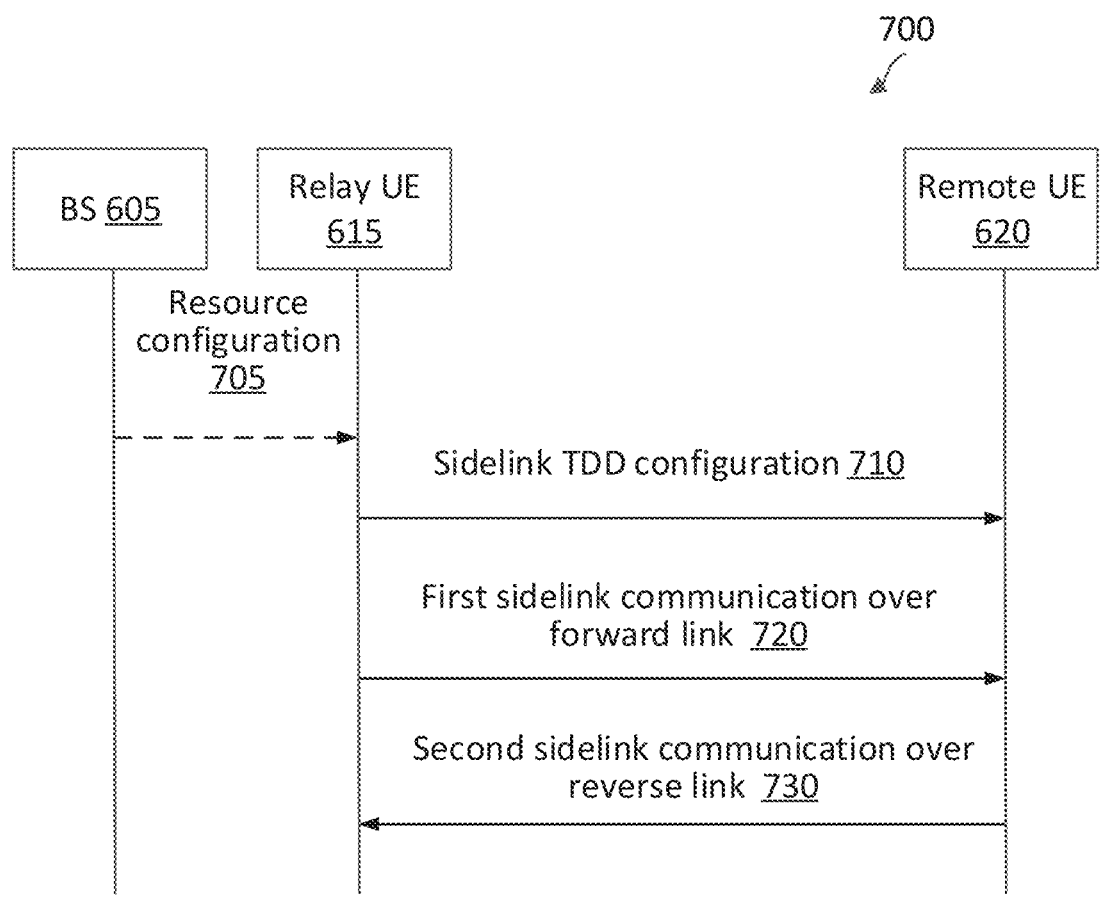
FIG. 7 is a sequence diagram illustrating a sidelink forward/reverse link resource partitioning method according to some aspects of the present disclosure.

FIG. 7 is a sequence diagram illustrating a sidelink forward/reverse resource partitioning method 700 according to some aspects of the present disclosure. The method 700 may be implemented between a BS 605, the relay UE 615, and the remote UE 620. The method 700 may employ similar mechanisms as discussed above with respect to FIGS. 4-6 for communications. Although the method 700 illustrates the relay UE 615 in communication with one remote UE 620, it should be understood that in other examples the relay UE 615 may communicate with any suitable number of remote UEs 620 (e.g., about 2, 3, 4, 5, 6 or more) over a sidelink. As illustrated, the method 700 includes a number of enumerated actions, but embodiments of the method 700 may include additional actions before, after, and in between the enumerated actions. In some embodiments, one or more of the enumerated actions may be omitted or performed in a different order.

At action 705, the BS 605 transmits a resource configuration to the relay UE 615. The resource configuration may indicate resource allocations with UL/DL resources and SL resources similar to the resources 630 shown in FIG. 6.

At action 710, the UE relay 615 transmits a time-division duplexing (TDD) configuration to the remote UE 620 indicating a first set of resources time-multiplexed with a second set of resources in a sidelink resource pool. The first set of resources may be used for communications over a forward link from the relay UE 615 to the remote UE 620. The second set of resources may be used for communications over a reverse sidelink from the remote UE 620 to the relay UE 615. In some aspects, the sidelink resource pool may correspond to the sidelink resource pool 640, and the first set of resources and the second set of resources may correspond to the SL resources that are marked with the symbols "F" and "R", respectively. In some aspects, the relay UE 615 may determine the sidelink resource pool based on the configuration received from the BS 605 and may partition the sidelink resource pool into the first and second set of resources. In some other aspects, the action 705 may be optional, and the relay UE 615 may determine the sidelink resource pool based on a pre-configuration. In some aspects, the first set of resources may be associated with a first link, and the second set of resources may be associated with a second link. In some aspects, the relay UE 615 may transmit a broadcast message via PSBCH to the remote UE 620 including the TDD configuration. In some aspects, the relay UE 615 may transmit a physical discovery message to the remote UE 620 including the TDD configuration. In some other aspects the remote UE 620 may transmits SCI during a sideling slot to the relay UE 615 via at least one of the PSCCH or PSCCH channels. In some aspects, the TDD configuration further indicates a TDD resource pattern for the first set of resources and the second set of resources as discussed above in relation to FIG. 6. In yet other aspects, the TDD configuration may indicate a periodicity of TDD resource pattern.

At action 720, the relay UE 615 may transmit sidelink communications signals to the remote UE 620 using a resource in the forward link resource pool as discussed above in FIG. 6. For instance, the relay UE 615 may transmit to the remote UE 620 sidelink data and control signaling (e.g., scheduling information, SCI). In some aspects, the relay UE 615 may transmit sidelink data over PSSCH, and control signaling over PCSCH in a resource similar to the resource 306 within the first set of resources.

At action 730, the remote UE 620 may transmit sidelink communications signals to the relay UE 615 using a resource in the reverse link resource pool as discussed above in FIG. 6. For instance, the remote UE 620 may transmit to the relay UE 615 sidelink data and control signaling (e.g., scheduling information, SCI). In some aspects, the remote UE 620 may transmit sidelink data over PSSCH, and control signaling over PSCCH in a resource similar to the resource 306 within the second set of resources.

Figure 8:
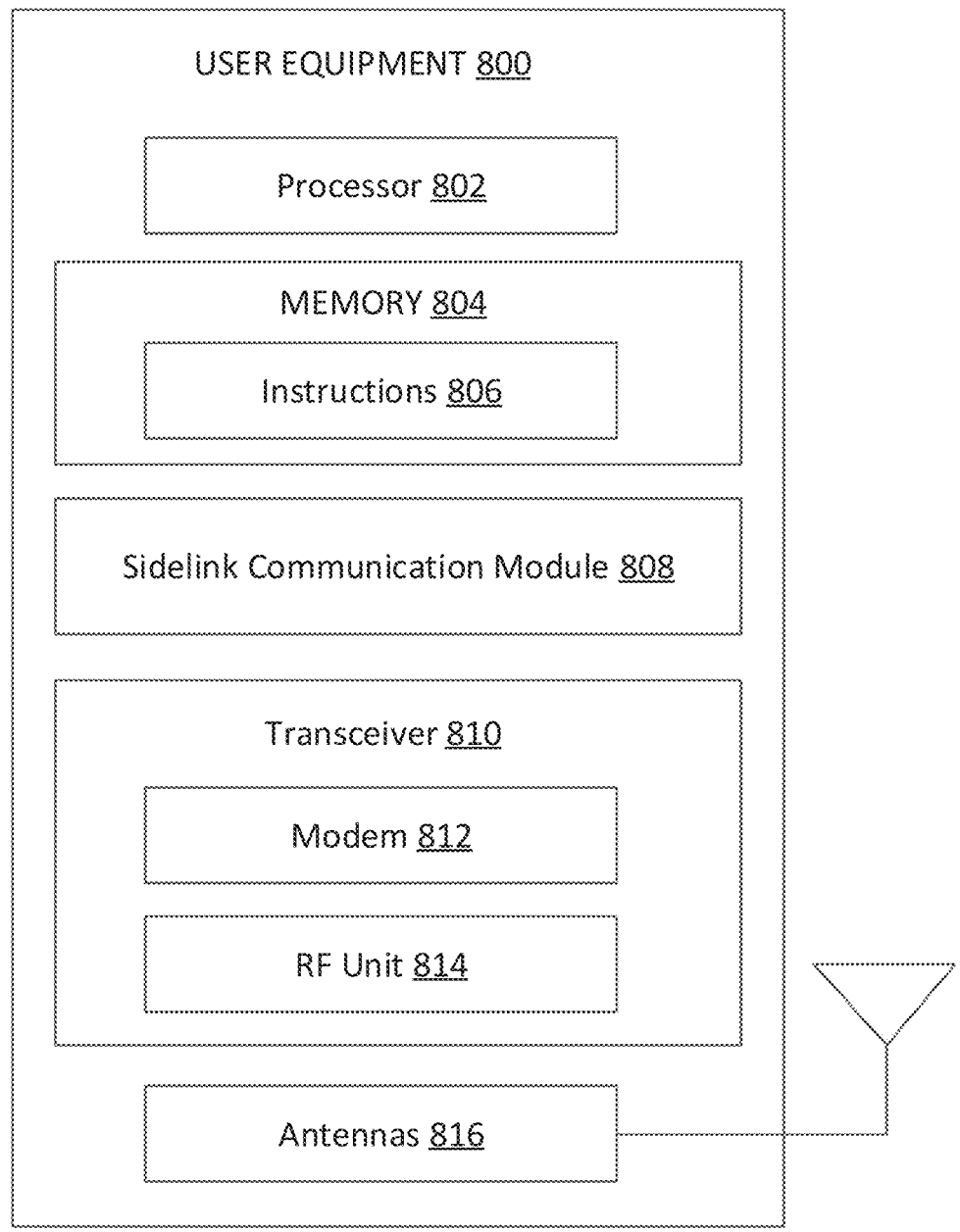
FIG. 8 is a block diagram of an exemplary user equipment (UE) according to some aspects of the present disclosure.

FIG. 8 is a block diagram of an exemplary UE 800 according to some aspects of the present disclosure. The UE 800 may be a UE 115 as discussed above with respect to FIG. 1, a UE 215 as discussed above with respect to FIG. 2, a UE 415 or 420 as discussed above with respect to FIG. 4, a UE 515 or 520 as discussed above with respect to FIG. 5, or a UE 615 or 620 as discussed above with respect to FIG. 6. As shown, the UE 800 may include a processor 802, a memory 804, a sidelink communication module 808, a transceiver 810 including a modem subsystem 812 and a radio frequency (RF) unit 814, and one or more antennas

816. These elements may be in direct or indirect communication with each other, for example via one or more buses.

The processor 802 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 804 includes a non-transitory computer-readable medium. The memory 804 may store, or have recorded thereon, instructions 806. The instructions 806 may include instructions that, when executed by the processor 802, cause the processor 802 to perform the operations described herein with reference to the UEs 115 in connection with aspects of the present disclosure, for example, aspects of FIGS. 2-7. Instructions 806 may also be referred to as program code, which may be interpreted broadly to include any type of computer-readable statement(s).

The sidelink communication 808 may be implemented via hardware, software, or combinations thereof. For example, the sidelink communication module 808 may be implemented as a processor, circuit, and/or instructions 806 stored in the memory 804 and executed by the processor 802. In some examples, the sidelink communication module 808 can be integrated within the modem subsystem 812. For example, the sidelink communication module 808 can be implemented by a combination of software components (e.g., executed by a DSP or a general processor) and hardware components (e.g., logic gates and circuitry) within the modem subsystem 812.

The sidelink communication module 808 may communicate with various components of the UE 800 to perform aspects of the present disclosure, for example, aspects of FIGS. 2-7. In some aspects, the UE 800 is a relay sidelink UE similar to the relay UE 415 of FIG. 4, the relay UE 515 of FIG. 5, or the relay UE 615 of FIG. 6. For instance, the sidelink communication module 808 is configured to transmit, to a second UE (e.g., a remote UE similar to the UE 115, 215, 420, 520, or 620) over a sidelink, a TDD configuration indicating a first set of resources time-multiplexed with a second set of resources in a sidelink resource pool as discussed above in relation to FIG. 6. The first set of resources may be associated with a forward link (e.g., the forward link 602), and the second set of resource may be associated with a reverse link (e.g., the reverse link 604). In some aspects, the first set of resources and the second set of resources may be similar to the SL resources 634 in the resource pool 640 of FIG. 6. In some aspects, the sidelink communication module 808 is further configured to transmit, to the second UE over the forward link, a first communication signal using a resource of the first set of resources and receive, from the second UE over the reverse link, a second communication signal in a resource of the second set of resources. For instance, the sidelink communication 808 may be configured to encode and transmit the PSCCH 310 and PSSCH 320 to the second UE using a resource from the first set of resources, and receive, from the second UE, and decode PSCCH 310 and PSSCH 320 in a resource from the second set of resources (e.g., by performing SCI sensing or monitoring in the second set of resources).

In some aspects, the sidelink communication module 808 is configured to indicate the partitioning between the first set of resources and the second set of resources semi-statically. For instance, the sidelink communication module 808 may be configured to transmit, to the second UE over the sidelink, a sidelink broadcast message including the TDD configuration via a PSBCH. In some other instances, the sidelink communication module 808 may be configured to transmit, to the second UE over the sidelink, a sidelink discovery message including the TDD configuration (via a PSDCH or a PSSCH).

In some aspects, the sidelink communication module 808 is further configured to indicate the partitioning between the first set of resources and the second set of resources dynamically. For instance, the sidelink communication module 808 may be further configured to transmit the TDD configuration to the second UE over the sidelink via at least one of a PSCCH or a PSSCH. The sidelink communication module 808 may be further configured to SCI including the TDD configuration via at least one of the PSCCH or the PSSCH. In some aspects the SCI message may indicate the sidelink slot formats (e.g., in SCIS). In some aspects, the sidelink communication module 808 may be further configured to transmit the SCI periodically.

In some aspects, the UE 800 is a remote sidelink UE similar to the remote UE 420 of FIG. 4, the remote UE 520 of FIG. 5, or the remote UE 620 of FIG. 6. For instance, the sidelink communication module 808 is configured to receive, from a second the UE (e.g., a relay UE similar to the UE 115, 215, 415, 515, or 615) over a sidelink, a TDD configuration indicating a first set of resources time-multiplexed with a second set of resources in a sidelink resource pool as discussed above in relation to FIG. 6. Each resource includes several sidelink slots. The first set of resources may be associated with a forward link (e.g., the forward link 602), and the second set of resource may be associated with a reverse link (e.g., the reverse link 604). In some aspects, the first set of resources and the second set of resources may be similar to the SL resources 634 in the resource pool 640 of FIG. 6. In some aspects, the sidelink communication module 808 is further configured to receive, from the second UE over the forward link, a first communication signal using a resource of the first set of resources and transmit, to the second UE over the reverse link, a second communication signal in a resource of the second set of resources. For instance, the sidelink communication 808 may configured to encode and transmit the PSCCH 310 and PSSCH 320 to the second UE using a resource from the second set of resources, and receive, from the second UE, and decode PSCCH 310 and PSSCH 320 in a resource from the first set of resources (e.g., by performing SCI sensing or monitoring in the first set of resources).

As shown, the transceiver 810 may include the modem subsystem 812 and the RF unit 814. The transceiver 810 can be configured to communicate bi-directionally with other devices, such as the BSs 105. The modem subsystem 812 may be configured to modulate and/or encode the data from the memory 804 and/or the sidelink communication module 808 according to a modulation and coding scheme (MCS), e.g., a low-density parity check (LDPC) coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., sidelink data, SCI, TDD configuration, forward/reverse link resource partitioning information, sidelink resource pool allocation) from the modem subsystem 812 (on outbound transmissions) or of transmissions originating from another source such as a UE 115 or a BS 105. The RF unit 814 may be further configured to perform analog beamforming in conjunction with the digital beamforming. Although shown as integrated together in transceiver 810, the modem subsystem 812 and the RF unit 814 may be separate devices that are coupled together at the UE 115 to enable the UE 115 to communicate with other devices.

The RF unit 814 may provide the modulated and/or processed data, e.g. data packets (or, more generally, data messages that may include one or more data packets and other information), to the antennas 816 for transmission to one or more other devices. The antennas 816 may further receive data messages transmitted from other devices. The antennas 816 may provide the received data messages for processing and/or demodulation at the transceiver 810. The transceiver 810 may provide the demodulated and decoded data (e.g., e.g., sidelink data, SCI, TDD configuration, forward/reverse link resource partitioning information, sidelink resource pool allocation) to the sidelink communication module 808 for processing. The antennas 816 may include multiple antennas of similar or different designs in order to sustain multiple transmission links. The RF unit 814 may configure the antennas 816.

In an aspect, the UE 800 can include multiple transceivers 810 implementing different RATs (e.g., NR and LTE). In an aspect, the UE 800 can include a single transceiver 810 implementing multiple RATs (e.g., NR and LTE). In an aspect, the transceiver 810 can include various components, where different combinations of components can implement different RATs.

Figure 9:
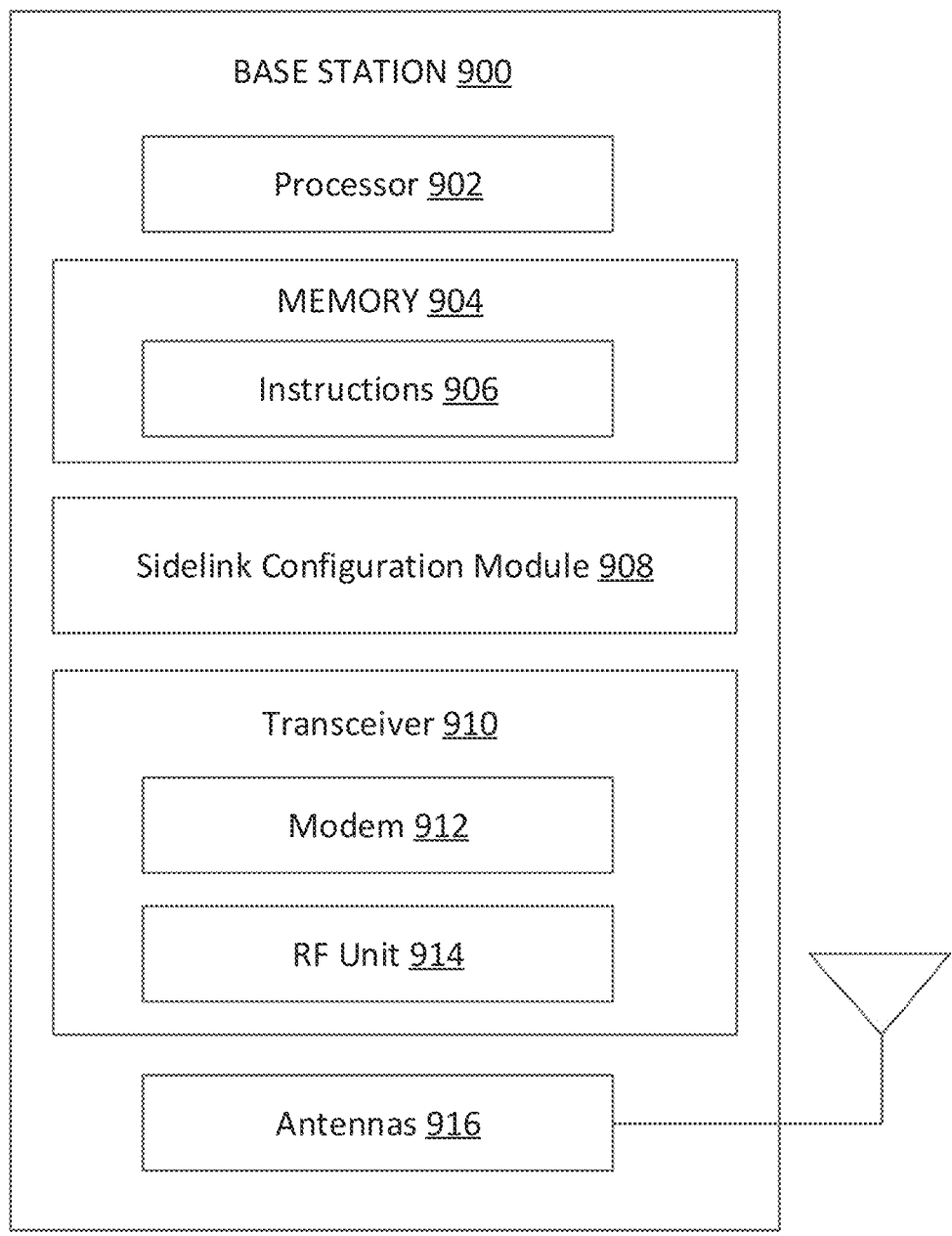
FIG. 9 is a block diagram of an exemplary base station (BS) according to some aspects of the present disclosure.

FIG. 9 is a block diagram of an exemplary BS 900 according to some aspects of the present disclosure. The BS 900 may be a BS 105 in the network 100 as discussed above in FIG. 1, a BS 205 as discussed above in FIG. 2, a BS 405 as discussed above in FIG. 4, a BS 505 as discussed above in FIG. 5, or a BS 605 as discussed above in FIG. 6. As shown, the BS 900 may include a processor 902, a memory 904, an sidelink configuration module 908, a transceiver 910 including a modem subsystem 912 and a RF unit 914, and one or more antennas 916. These elements may be in direct or indirect communication with each other, for example via one or more buses.

The processor 902 may have various features as a specific-type processor. For example, these may include a CPU, a DSP, an ASIC, a controller, a FPGA device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 904 may include a non-transitory computer-readable medium. The memory 904 may store instructions 906. The instructions 906 may include instructions that, when executed by the processor 902, cause the processor 902 to perform operations described herein, for example, aspects of FIGS. 2-7. Instructions 906 may also be referred to as program code. The program code may be for causing a wireless communication device to perform these operations, for example by causing one or more processors (such as processor 902) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The sidelink configuration module 908 may be implemented via hardware, software, or combinations thereof. For example, the sidelink configuration module 908 may be implemented as a processor, circuit, and/or instructions 906 stored in the memory 904 and executed by the processor 902. In some examples, the sidelink configuration module 908 can be integrated within the modem subsystem 912. For example, the sidelink configuration module 908 can be implemented by a combination of software components (e.g., executed by a DSP or a general processor) and hardware components (e.g., logic gates and circuitry) within the modem subsystem 912.

The sidelink configuration module 908 may communicate with various components of the BS 900 to perform various aspects of the present disclosure, for example, aspects of FIGS. 2-7. The sidelink configuration module 908 is configured to configure UEs (e.g., the UEs 115, 215, 415 and/or 515) with sidelink resource pools for sidelink communications. In some aspects, the sidelink configuration module 908 may configure the UEs with a resource pool (e.g., resource pool 640) as discussed above in relation to FIGS. 6 and 7. In some aspects, the sidelink configuration module 908 may communicate with a relay UE and a remote UE (via the relay UE) as discussed above in relation to FIGS. 4-6.

As shown, the transceiver 910 may include the modem subsystem 912 and the RF unit 914. The transceiver 910 can be configured to communicate bi-directionally with other devices, such as the UEs 115 and/or another core network element. The modem subsystem 912 may be configured to modulate and/or encode data according to a MCS, e.g., a LDPC coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data (e.g., RRC configuration, sidelink resource pools configurations) from the modem subsystem 912 (on outbound transmissions) or of transmissions originating from another source such as a UE 115. The RF unit 914 may be further configured to perform analog beamforming in conjunction with the digital beamforming. Although shown as integrated together in transceiver 910, the modem subsystem 912 and/or the RF unit 914 may be separate devices that are coupled together at the BS 105 to enable the BS 105 to communicate with other devices.

The RF unit 914 may provide the modulated and/or processed data, e.g. data packets (or, more generally, data messages that may contain one or more data packets and other information), to the antennas 916 for transmission to one or more other devices. This may include, for example, transmission of information to complete attachment to a network and communication with a camped UE 115 according to some aspects of the present disclosure. The antennas 916 may further receive data messages transmitted from other devices and provide the received data messages for processing and/or demodulation at the transceiver 910. The transceiver 910 may provide the demodulated and decoded data to the sidelink configuration module 908 for processing. The antennas 916 may include multiple antennas of similar or different designs in order to sustain multiple transmission links.

In an aspect, the BS 900 can include multiple transceivers 910 implementing different RATs (e.g., NR and LTE). In an aspect, the BS 900 can include a single transceiver 910 implementing multiple RATs (e.g., NR and LTE). In an aspect, the transceiver 910 can include various components, where different combinations of components can implement different RATs.

Figure 10:
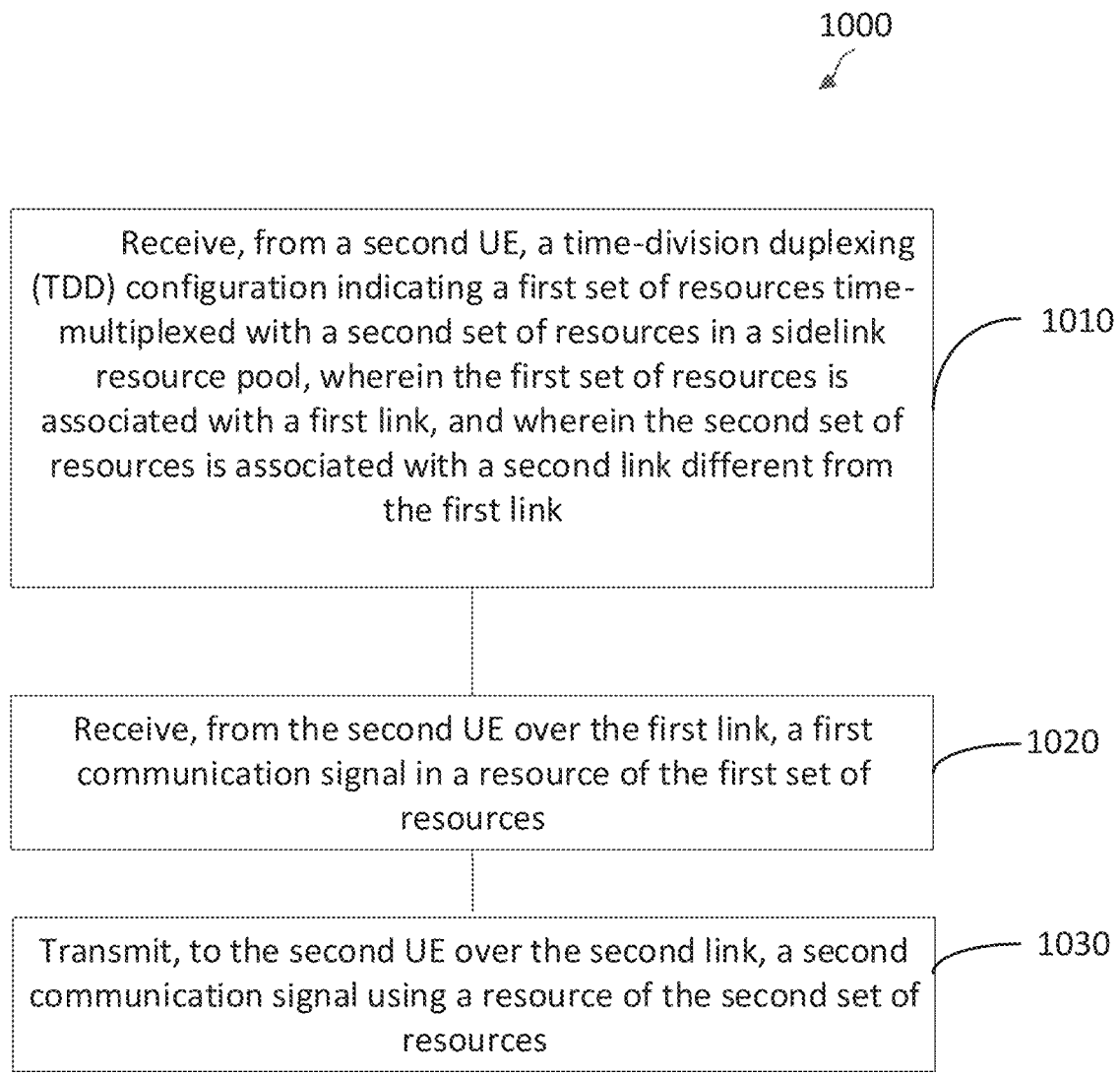
FIG. 10 is a flow diagram of a communication method according to some aspects of the present disclosure.

FIG. 10 is a flow diagram of a sidelink system information broadcasting process 1000 according to some aspects of the present disclosure. Aspects of the process 1000 can be executed by a computing device (e.g., a processor, processing circuit, and/or other suitable component) of a wireless communication device or other suitable means for performing the steps. For example, a wireless communication device, such as the UEs 115, 215, 420, and/or 520, may utilize one or more components, such as the processor 802, the memory 804, the sidelink communication module 808, the transceiver 810, the modem 812, and the one or more antennas 816, to execute the steps of process 1000. The process 1000 may employ, at least in part, similar mechanisms as discussed above with respect to FIGS. 6-7. As illustrated, the process 1000 includes a number of enumerated steps, but aspects of the process 1000 may include additional steps before, after, and in between the enumerated steps. In some aspects, one or more of the enumerated steps may be omitted or performed in a different order.

At block 1010, a first UE may receive, from a second UE, time-division duplexing (TDD) configuration indicating a first set of resources time-multiplexed with a second set of resources in a sidelink resource pool. The first UE may be a remote UE similar to the remote UEs 420, 520, and 620, and the second UE may be a relay UE similar to the relay UEs 415, 515, and 615. In some instances, the first set of resources is associated with a first link, and the second set of resources is associated with a second link different from the first link. In some instances the first set link may be similar to the forward link 602 of FIG. 6, and the second link may be similar to the reserve link 604 of FIG. 6. In some instances, the sidelink resource pool may correspond to the sidelink resource pool 640, and the first set of resources and the second set of resources may correspond to the SL resources that are marked with the symbols "F" and "R", respectively as shown in FIG. 6.

In some aspects, the first UE may receive the TDD configuration in a sidelink broadcast message via a PSBCH. In some aspects, the first UE may receive the TDD configuration in a sidelink discovery message via a PSDCH or a PSBCH during a sidelink discovery procedure.

In some aspects, the first UE may receive first UE may receive the TDD configuration in SCI over a PSSCH or a PSCCH. In some aspects, the first UE may receive, from the second UE via the PSCCH during a sidelink slot, SCI including a destination identifier identifying the first UE. As part of receiving the TDD configuration, the first UE may receive, from the second UE via the at least one of the PSCCH or the PSSCH during the sidelink slot, the TDD configuration based on the destination identifier (ID). In some aspects, the first UE may receive the TDD configuration in a slot format indicator, for example, periodically according to periodicity of the slot format indicator.

In some aspects, the TDD configuration further indicates a TDD resource pattern for the first set of resources and the second set of resources, for example, as shown by the pattern "FFRRFFRRFF . . . " of FIG. 6. In some aspects, the TDD configuration further indicates a periodicity (e.g., of about 10, 20, 30, 40, or more slots 631) of the TDD resource pattern. In some aspects, the TDD resource pattern indicates a first set of time slots (e.g., the slots 631) and a second set of time slots different from the first set of time slots, where each resource of the first set of resources is within a time slot of the first set of time slots, and each resource of the second set of resources is within a time slot of the second set of time slots. In some aspects, the first UE may receive the TDD configuration in a slot format indicator. In some instances, the first UE may utilize one or more components, such as the processor 802, the sidelink communication module 808, the transceiver 810, the modem 812, and the one or more antennas 816, to receive the TDD configuration.

At block 1020, the first UE may receive, from the second UE over the first link, a first communication signal in a resource of the first set of resources. In some instances, the first UE may receive data over PSSCH, and control signaling over PSCCH. In some instances, the first UE may utilize one or more components, such as the processor 802, the sidelink communication module 808, the transceiver 810, the modem 812, and the one or more antennas 816, to receive and process PSSCH sidelink data and the PSCCH control signaling.

At block 1030, the first UE may transmit, to the second UE over the first link, a first communication signal in a resource of the first set of resources. In some instances, the first UE may transmit data over PSSCH, and control signaling over PSCCH. In some instances, the first UE may utilize one or more components, such as the processor 802, the sidelink communication module 808, the transceiver 810, the modem 812, and the one or more antennas 816, to generate and transmit the PSSCH sidelink data and the PSCCH control signaling.

Figure 11:
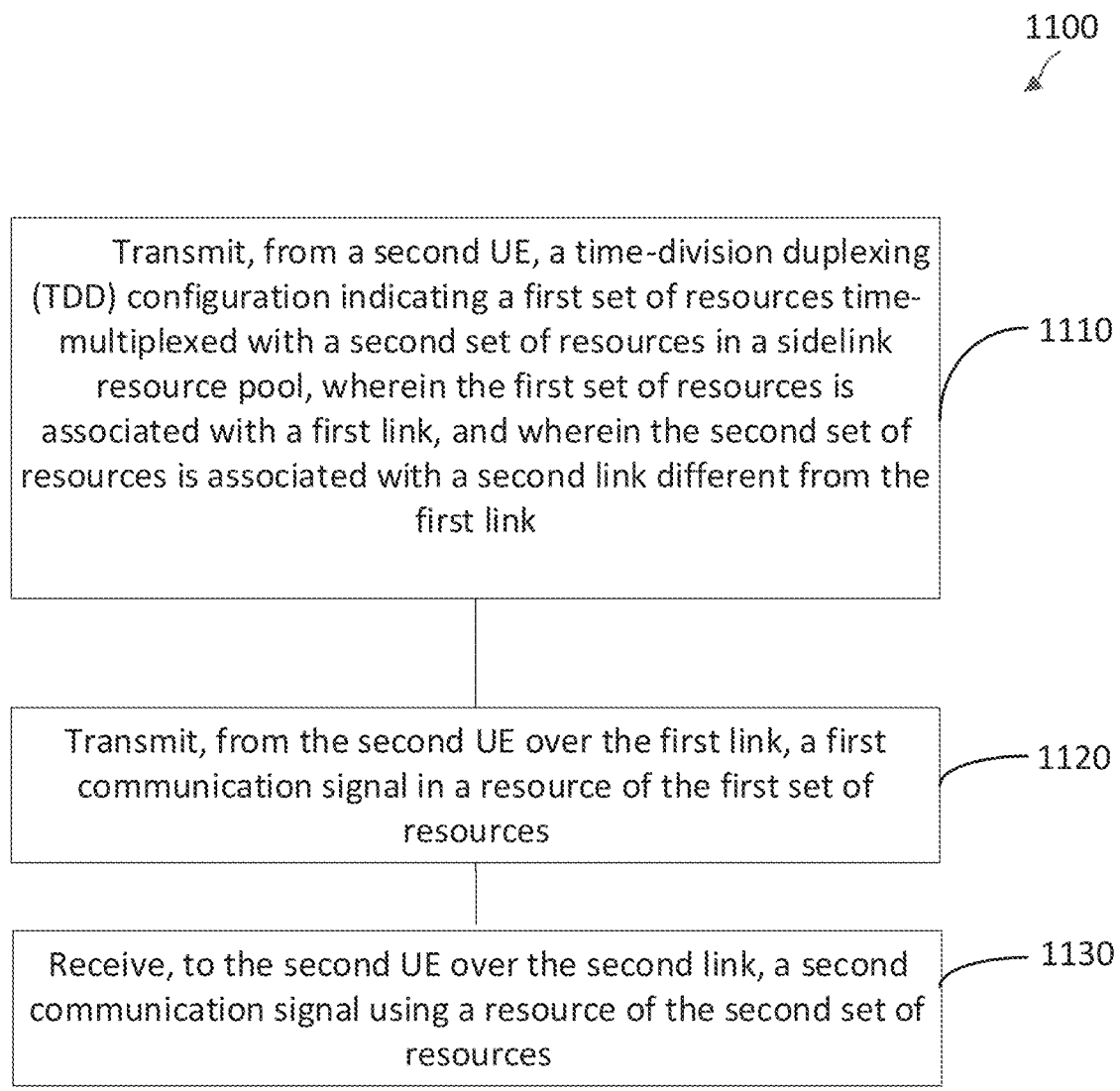
FIG. 11 is a flow diagram of a communication method according to some aspects of the present disclosure.

FIG. 11 is a flow diagram of a sidelink system information broadcasting process 1100 according to some aspects of the present disclosure. Aspects of the process 1100 can be executed by a computing device (e.g., a processor, processing circuit, and/or other suitable component) of a wireless communication device or other suitable means for performing the steps. For example, a wireless communication device, such as the UEs 115, 215, 415, and/or 515, may utilize one or more components, such as the processor 802, the memory 804, the sidelink communication module 808, the transceiver 810, the modem 812, and the one or more antennas 816, to execute the steps of process 1100. The process 1100 may employ, at least in part, similar mechanisms as in the process 800 discussed above with respect to FIGS. 6-7. As illustrated, the process 1100 includes a number of enumerated steps, but aspects of the process 1100 may include additional steps before, after, and in between the enumerated steps. In some aspects, one or more of the enumerated steps may be omitted or performed in a different order.

At block 1110, a first UE may transmit, to a second UE, time-division duplexing (TDD) configuration indicating a first set of resources time-multiplexed with a second set of resources in a sidelink resource pool. The first UE may be a relay UE similar to the relay UEs 415, 515, and 615, and the second UE may be a remote UE similar to the remote UEs 420, 520, and 620. In some instances, the first set of resources is associated with a first link, and the second set of resources is associated with a second link different from the first link. In some instances, the first set link may be similar to the forward link 602 of FIG. 6, and the second link may be similar to the reserve link 604 of FIG. 6. In some instances, the sidelink resource pool may correspond to the sidelink resource pool 640, and the first set of resources and the second set of resources may correspond to the SL resources that are marked with the symbols "F" and "R", respectively as shown in FIG. 6. In some aspects, the first UE may transmit the TDD configuration in a sidelink broadcast message via a PSBCH. In some aspects, the first UE may transmit the TDD configuration in a sidelink discovery message via a PSDCH or a PSBCH during a sidelink discovery procedure.

In some aspects, the first UE may transmit the TDD configuration in SCI over a PSSCH or a PSCCH. In some aspects, the first UE may transmit, to the second UE via the PSCCH during a sidelink slot, SCI including a destination identifier identifying the first UE. As part of transmitting the TDD configuration, the first UE may transmit, to the second UE via the at least one of the PSCCH or the PSSCH during the sidelink slot, the TDD configuration based on the destination identifier (ID). In some aspects, the first UE may transmit the TDD configuration in a slot format indicator, for example, periodically according to periodicity of the slot format indicator.

In some aspects, the TDD configuration further indicates a TDD resource pattern for the first set of resources and the second set of resources, for example, as shown by the pattern "FFRRFFRRFF . . . " of FIG. 6. In some aspects, the TDD configuration further indicates a periodicity (e.g., of about 10, 20, 30, 40, or more slots 631) of the TDD resource pattern. In some aspects, the TDD resource pattern indicates a first set of time slots (e.g., the slots 631) and a second set of time slots different from the first set of time slots, where each resource of the first set of resources is within a time slot of the first set of time slots, and each resource of the second set of resources is within a time slot of the second set of time slots. In some aspects, the first UE may receive the TDD configuration in a slot format indicator. In some instances, the first UE may utilize one or more components, such as the processor 802, the sidelink communication module 808, the transceiver 810, the modem 812, and the one or more antennas 816, to transmit the TDD configuration.

At block 1120, the first UE may transmit, to the second UE over the first link, a first communication signal in a resource of the first set of resources. In some instances, the first UE may transmit data over PSSCH, and control signaling over PSCCH. In some instances, the first UE may utilize one or more components, such as the processor 802, the sidelink communication module 808, the transceiver 810, the modem 812, and the one or more antennas 816, to generate and transmit the PSSCH sidelink data and the PSCCH control signaling.

At block 1130, the first UE may receive, from the second UE over the first link, a first communication signal in a resource of the first set of resources. In some instances, the first UE may receive data over PSSCH, and control signaling over PSCCH. In some instances, the second UE may utilize one or more components, such as the processor 802, the sidelink communication module 808, the transceiver 810, the modem 812, and the one or more antennas 816, to receive and process PSSCH sidelink data and the PSCCH control signaling.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Example Aspects of the Present Disclosure

Aspect 1. A method of wireless communication performed by a first user equipment (UE), the method comprising: receiving, from a second UE, a time-division duplexing (TDD) configuration indicating a first set of resources time-multiplexed with a second set of resources in a sidelink resource pool, wherein the first set of resources is associated with a first link, and wherein the second set of resources is associated with a second link different from the first link; receiving, from the second UE over the first link, a first communication signal in a resource of the first set of resources; and transmitting, to the second UE over the second link, a second communication signal using a resource of the second set of resources.

Aspect 2. The method of aspect 1, wherein the receiving the TDD configuration comprises: receiving, from the second UE via a physical sidelink broadcast channel (PSBCH), a sidelink broadcast message including the TDD configuration.

Aspect 3. The method of any of aspects 1-2, wherein the receiving the configuration comprises: receiving, from the second UE, a sidelink discovery message including the TDD configuration.

Aspect 4. The method of any of aspects 1-3, wherein the receiving the TDD configuration comprises: receiving, from the second UE via at least one of a physical sidelink control channel (PSCCH) or a physical sidelink shared channel (PSSCH), the TDD configuration.

Aspect 5. The method of aspect 4, further comprising: receiving, from the second UE via the PSCCH during a sidelink slot, sidelink control information (SCI) including a destination identifier identifying the first UE, wherein the receiving the configuration further comprises: receiving, from the second UE via the at least one of the PSCCH or the PSSCH during the sidelink slot, the TDD configuration based on the destination identifier (ID).

Aspect 6. The method of any of aspects 1-5, wherein the TDD configuration further indicates a TDD resource pattern for the first set of resources and the second set of resources.

Aspect 7. The method of aspect 6, wherein the TDD configuration further indicates a periodicity of the TDD resource pattern.

Aspect 8. The method of any of aspects 6-7, wherein the TDD resource pattern indicates a first set of time slots and a second set of time slots different from the first set of time slots, wherein each resource of the first set of resources is within a time slot of the first set of time slots, and wherein each resource of the second set of resources is within a time slot of the second set of time slots.

Aspect 9. The method of any of aspects 6-8, wherein the receiving the TDD configuration comprises: receiving, from the second UE, a slot format indicator indicating the TDD resource pattern.

Aspect 10. The method of aspect 9, wherein the receiving the slot format indicator is based on a periodicity associated with the slot format indicator.

Aspect 11. The method of any of aspects 1-10, wherein the first UE is a remote UE, and wherein the second UE is a relay UE.

Aspect 12. A method of wireless communication performed by a first user equipment (UE), the method comprising: transmitting, to a second UE, a time-division duplexing (TDD) configuration indicating a first set of resources time-multiplexed with a second set of resources in a sidelink resource pool, wherein the first set of resources is associated with a first link, and wherein the second set of resources is associated with a second link different from the first link; transmitting, to the second UE over the first link, a first communication signal using a resource of the first set of resources; and receiving, from the second UE over the second link, a second communication signal in a resource of the second set of resources.

Aspect 13. The method of aspect 12, wherein the transmitting the TDD configuration comprises: transmitting, to the second UE via a physical sidelink broadcast channel (PSBCH), a sidelink broadcast message including the TDD configuration.

Aspect 14. The method of aspect 12, wherein the transmitting the TDD configuration comprises: transmitting, to the second UE, a sidelink discovery message including the TDD configuration.

Aspect 15. The method of aspect 12, wherein the transmitting the TDD configuration comprises: transmitting, to the second UE via at least one of a physical sidelink control channel (PSCCH) or a physical sidelink shared channel (PSSCH), the TDD configuration.

Aspect 16. The method of aspect 15, further comprising: transmitting, to the second UE via the PSCCH during a sidelink slot, sidelink control information (SCI) including a destination identifier identifying the first UE, wherein the transmitting the configuration further comprises: transmitting, to the second UE via the at least one of the PSCCH or the PSSCH during the sidelink slot, the TDD configuration based on the destination identifier (ID).

Aspect 17. The method of any of aspects 12-16, wherein the TDD configuration further indicates a TDD resource pattern for the first set of resources and the second set of resources.

Aspect 18. The method of aspect 17, wherein the TDD configuration further indicates a periodicity of the TDD resource pattern.

Aspect 19. The method of aspect 17, wherein the TDD resource pattern indicates a first set of time slots and a second set of time slots different from the first set of time slots, wherein each resource of the first set of resources is within a time slot of the first set of time slots, and wherein each resource of the second set of resources is within a time slot of the second set of time slots.

Aspect 20. The method of any of aspects 17-19, wherein the transmitting the TDD configuration comprises: transmitting, to the second UE, a slot format indicator indicating the TDD resource pattern.

Aspect 21. The method of aspect 20, wherein the transmitting the slot format indicator is based on a periodicity associated with the slot format indicator.

Aspect 22. The method of any of aspects 17-21, further comprising: determining the TDD resource pattern for the first set of resources and the second set of resources.

Aspect 23. The method of any of aspects 12-22, further comprising: receiving, from a base station (BS), a sidelink resource configuration, wherein the transmitting the TDD configuration is based on the received sidelink resource configuration.

Aspect 24. The method of any of aspects 12-23, wherein the first UE is a relay UE, and wherein the second UE is a remote UE.

Aspect 25. A first user equipment (UE), comprising: a processor and a transceiver configured to perform the actions of any of aspects 1-11.

Aspect 26. A first user equipment (UE), comprising: a processor and a transceiver configured to perform the actions of any of aspects 12-24.

Aspect 27. A non-transitory, computer-readable medium having program code recorded thereon, the program code comprising instructions executable by a first user equipment (UE), wherein the program code comprises code for performing the steps of any of aspects 1-11.

Aspect 28. A non-transitory, computer-readable medium having program code recorded thereon, the program code comprising instructions executable by a first user equipment (UE), wherein the program code comprises code for performing the steps of any of aspects 12-24.

Aspect 29. A first user equipment (UE) comprising means for performing the steps of any of aspects 1-11.

Aspect 30. A first user equipment (UE) comprising means for performing the steps of any of aspects 12-24.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a first user equipment (UE), the method comprising:
    receiving, from a second UE, a time-division duplexing (TDD) configuration indicating a first set of resources time-multiplexed with a second set of resources in a sidelink resource pool, wherein the sidelink resource pool is network-configured, wherein the first set of resources is associated with a first link and the second set of resources is associated with a second link different from the first link, and wherein the TDD configuration is generated by the second UE in accordance with resource partitioning updated for the sidelink resource pool, the updating being in accordance with at least one of traffic needs or traffic conditions over the first link and the second link;
    receiving, from the second UE over the first link, a first communication signal in a resource of the first set of resources; and
    transmitting, to the second UE over the second link, a second communication signal using a resource of the second set of resources.

2. The method of claim 1, wherein the receiving the TDD configuration comprises: receiving, from the second UE via a physical sidelink broadcast channel (PSBCH), a sidelink broadcast message including the TDD configuration.

3. The method of claim 1, wherein the receiving the TDD configuration comprises:
    receiving, from the second UE, a sidelink discovery message including the TDD configuration.

4. The method of claim 1, wherein the receiving the TDD configuration comprises: receiving, from the second UE via at least one of a physical sidelink control channel (PSCCH) or a physical sidelink shared channel (PSSCH), the TDD configuration.

5. The method of claim 4, further comprising:
    receiving, from the second UE via the PSCCH during a sidelink slot, sidelink control information (SCI) including a destination identifier identifying the first UE,
    wherein the receiving the TDD configuration further comprises:
    receiving, from the second UE via the at least one of the PSCCH or the PSSCH during the sidelink slot, the TDD configuration based on the destination identifier (ID).

6. The method of claim 1, wherein the TDD configuration further indicates a TDD resource pattern for the first set of resources and the second set of resources.

7. The method of claim 6, wherein the TDD configuration further indicates a periodicity of the TDD resource pattern.

8. The method of claim 6, wherein the TDD resource pattern indicates a first set of time slots and a second set of time slots different from the first set of time slots, wherein each resource of the first set of resources is within a time slot of the first set of time slots, and wherein each resource of the second set of resources is within a time slot of the second set of time slots.

9. The method of claim 6, wherein the receiving the TDD configuration comprises: receiving, from the second UE, a slot format indicator indicating the TDD resource pattern.

10. The method of claim 9, wherein the receiving the slot format indicator is based on a periodicity associated with the slot format indicator.

11. The method of claim 1, wherein the first UE is a remote UE, and wherein the second UE is a relay UE.

12. A method of wireless communication performed by a first user equipment (UE), the method comprising:
    updating resource partitioning for a sidelink resource pool in accordance with at least one of traffic needs or traffic conditions over a first link and a second link different from the first link, wherein the resource pool is network-configured;
    generating a time-division multiplexing (TDD) configuration in accordance with the updated resource partitioning, the TDD configuration indicating a first set of resources time-multiplexed with a second set of resources in the sidelink resource pool, wherein the first set of resources is associated with the first link and the second set of resources is associated with the second link;
    transmitting, to a second UETDD configuration-transmitting, to the second UE over the first link, a first communication signal using a resource of the first set of resources; and
    receiving, from the second UE over the second link, a second communication signal in a resource of the second set of resources.

13. The method of claim 12, wherein the transmitting the TDD configuration comprises:
    transmitting, to the second UE via a physical sidelink broadcast channel (PSBCH), a sidelink broadcast message including the TDD configuration.

14. The method of claim 12, wherein the transmitting the TDD configuration comprises:
    transmitting, to the second UE, a sidelink discovery message including the TDD configuration.

15. The method of claim 12, wherein the transmitting the TDD configuration comprises:
    transmitting, to the second UE via at least one of a physical sidelink control channel (PSCCH) or a physical sidelink shared channel (PSSCH), the TDD configuration.

16. The method of claim 15, further comprising:
    transmitting, to the second UE via the PSCCH during a sidelink slot, sidelink control information (SCI) including a destination identifier identifying the first UE,
    wherein the transmitting the TDD configuration further comprises:
    transmitting, to the second UE via the at least one of the PSCCH or the PSSCH during the sidelink slot, the TDD configuration based on the destination identifier (ID).

17. The method of claim 12, wherein the TDD configuration further indicates a TDD resource pattern for the first set of resources and the second set of resources.

18. The method of claim 17, wherein the TDD configuration further indicates a periodicity of the TDD resource pattern.

19. The method of claim 17, wherein the TDD resource pattern indicates a first set of time slots and a second set of time slots different from the first set of time slots, wherein each resource of the first set of resources is within a time slot of the first set of time slots, and wherein each resource of the second set of resources is within a time slot of the second set of time slots.

20. The method of claim 17, wherein the transmitting the TDD configuration comprises:
transmitting, to the second UE, a slot format indicator indicating the TDD resource pattern.

21. The method of claim 20, wherein the transmitting the slot format indicator is based on a periodicity associated with the slot format indicator.

22. The method of claim 17, further comprising:
determining the TDD resource pattern for the first set of resources and the second set of resources.

23. The method of claim 12, further comprising:
receiving, from a base station (BS), a sidelink resource configuration,
wherein the transmitting the TDD configuration is based on the received sidelink resource configuration.

24. The method of claim 12, wherein the first UE is a relay UE, and wherein the second UE is a remote UE.

25. A first user equipment (UE) comprising:
one or more memories; and
one or more processors coupled with the one or more memories, at least one processor of the one or more processors configured to cause the first UE to:
receive, from a second UE, a time-division duplexing (TDD) configuration to indicate a first set of resources time-multiplexed with a second set of resources in a sidelink resource pool, wherein the resource pool is network-configured, wherein the first set of resources is associated with a first link and the second set of resources is associated with a second link different from the first link, and wherein the TDD configuration is generated by the second UE in accordance with resource partitioning updated for the sidelink resource pool, the updating being in accordance with at least one of traffic needs or traffic conditions over the first link and the second link;
receive, from the second UE over the first link, a first communication signal in a resource of the first set of resources; and
transmit, to the second UE over the second link, a second communication signal using a resource of the second set of resources.

26. The first UE of claim 25, wherein the at least one processor of the one or more processors configured to receive the TDD configuration is further configured to cause the first UE to:
receive, from the second UE via a physical sidelink broadcast channel (PSBCH), a sidelink broadcast message including the TDD configuration.

27. The first UE of claim 25, wherein the at least one processor of the one or more processors configured to receive the TDD configuration is further configured to cause the first UE to:
receive, from the second UE, a sidelink discovery message including the TDD configuration.

28. The first UE of claim 25, wherein the at least one processor of the one or more processors configured to receive the TDD configuration is further configured to cause the first UE to:
receive, from the second UE via at least one of a physical sidelink control channel (PSCCH) or a physical sidelink shared channel (PSSCH), the TDD configuration.

29. A first user equipment (UE) comprising:
one or more memories; and
one or more processors coupled with the one or more memories, at least one processor of the one or more processors configured to cause the first UE to:
update resource partitioning for a sidelink resource pool in accordance with at least one of traffic needs or traffic conditions over a first link and a second link different from the first link, wherein the sidelink resource pool is network-configured;
generate a time-division multiplexing (TDD) configuration in accordance with the updated resource partitioning, the TDD configuration indicating a first set of resources time-multiplexed with a second set of resources in the sidelink resource pool, wherein the first set of resources is associated with the first link and the second set of resources is associated with the second link;
transmit, to a second UE, the TDD configuration transmit, to the second UE over the first link, a first communication signal using a resource of the first set of resources; and
receive, from the second UE over the second link, a second communication signal in a resource of the second set of resources.

30. The first UE of claim 29, wherein the first UE is a relay UE, and wherein the second UE is a remote UE.

* * * * *